US007039753B2

(12) United States Patent
Suzuki et al.

(10) Patent No.: US 7,039,753 B2
(45) Date of Patent: May 2, 2006

(54) MEMORY DEVICE AND RECORDING AND/OR REPRODUCING APPARATUS USING THE SAME

(75) Inventors: Kaoru Suzuki, Aichi (JP); Manabu Onodera, Kanagawa (JP)

(73) Assignee: Sony Corporation, (JP)

( * ) Notice: Subject to any disclaimer, the term of this patent is extended or adjusted under 35 U.S.C. 154(b) by 245 days.

(21) Appl. No.: 10/469,208

(22) PCT Filed: Dec. 18, 2002

(86) PCT No.: PCT/JP02/13258

§ 371 (c)(1), (2), (4) Date: Aug. 25, 2003

(87) PCT Pub. No.: WO03/056433

PCT Pub. Date: Jul. 10, 2003

(65) Prior Publication Data

US 2004/0103240 A1 May 27, 2004

(30) Foreign Application Priority Data

Dec. 25, 2001 (JP) ............................ 2001-392453

(51) Int. Cl.
*G06F 12/02* (2006.01)

(52) U.S. Cl. ..................................................... 711/102

(58) Field of Classification Search .................... 711/4, 711/102, 154, 155; 707/200
See application file for complete search history.

(56) References Cited

U.S. PATENT DOCUMENTS 6,377,500 B1 4/2002 Fujimoto et al.
6,694,415 B1 * 2/2004 March et al. ............... 711/163
2003/0120858 A1 * 6/2003 March et al. ............... 711/103
2004/0177229 A1 * 9/2004 March et al. ............... 711/173

OTHER PUBLICATIONS

U.S. Appl. No. 09/662,953 to Roger March et al, "Memory Devices and Methods for Use Therewith".*

* cited by examiner

*Primary Examiner*—Donald Sparks
*Assistant Examiner*—Jared Rutz
(74) *Attorney, Agent, or Firm*—Lerner, David, Littenberg, Krumholz & Mentlik, LLP

(57) ABSTRACT

A memory card uses a write-once type memory IC. A logical address is provided for each block as a predetermined data unit. Each block includes an area in which a data use status flag is recorded which indicates that data has been recorded in a block. Each block also includes an area in which a block status flag is recorded which indicates that data recorded in a block has been deleted.

7 Claims, 19 Drawing Sheets

BLOCK SIZE 16KB

CAPACITY: 16MB (segments 0–1), 32MB (segments 0–3), 64MB (segments 0–7), 128MB (segments 0–15)

| SEGMENT NUMBER | PHYSICAL BLOCK NUMBER (LOGICAL ADDRESS) |
| --- | --- |
| 0 | 0~511 (0~493) |
| 1 | 512~1023 (494~989) |
| 2 | 1024~1535 (990~1485) |
| 3 | 1536~2047 (1486~1981) |
| 4 | 2048~2559 (1982~2477) |
| 5 | 2560~3071 (2478~2973) |
| 6 | 3072~3583 (2974~3469) |
| 7 | 3584~4095 (3470~3965) |
| 8 | 4096~4607 (3966~4461) |
| 9 | 4608~5119 (4462~4957) |
| 10 | 5120~5631 (4958~5453) |
| 11 | 5632~6143 (5454~5949) |
| 12 | 6144~6655 (5950~6445) |
| 13 | 6656~7167 (6446~6941) |
| 14 | 7168~7679 (6942~7437) |
| 15 | 7680~8191 (7438~7933) |

FIG.8

FIG.13A
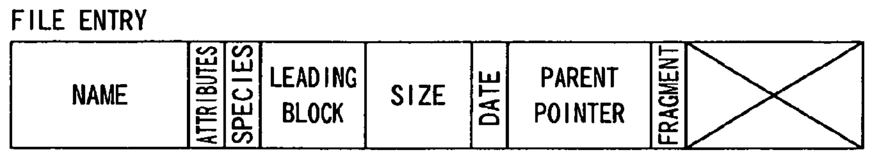
FIG.13B
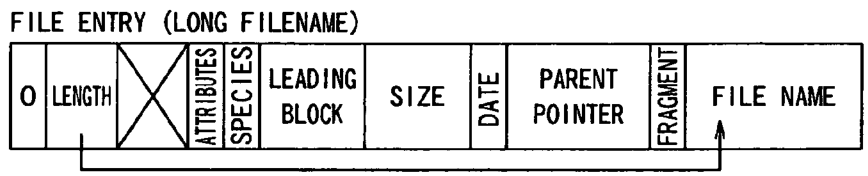
FIG.13C
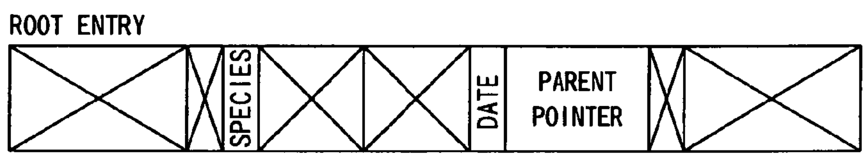
FIG.13D
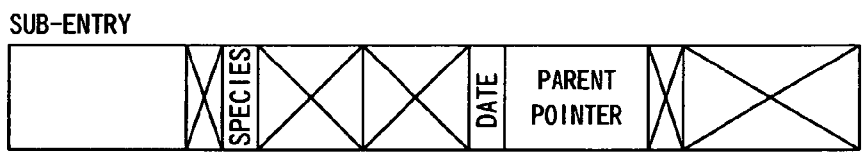
FIG.13E
SESSION ANCHOR
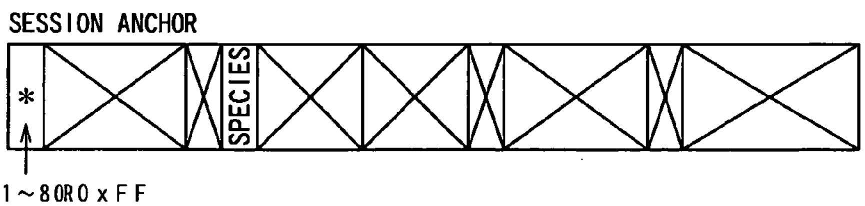
FIG.13F
DIRECTORY MARK
SPECIES | BLOCK FOR STORAGE | START ENTRY | END ENTRY | PARENT POINTER

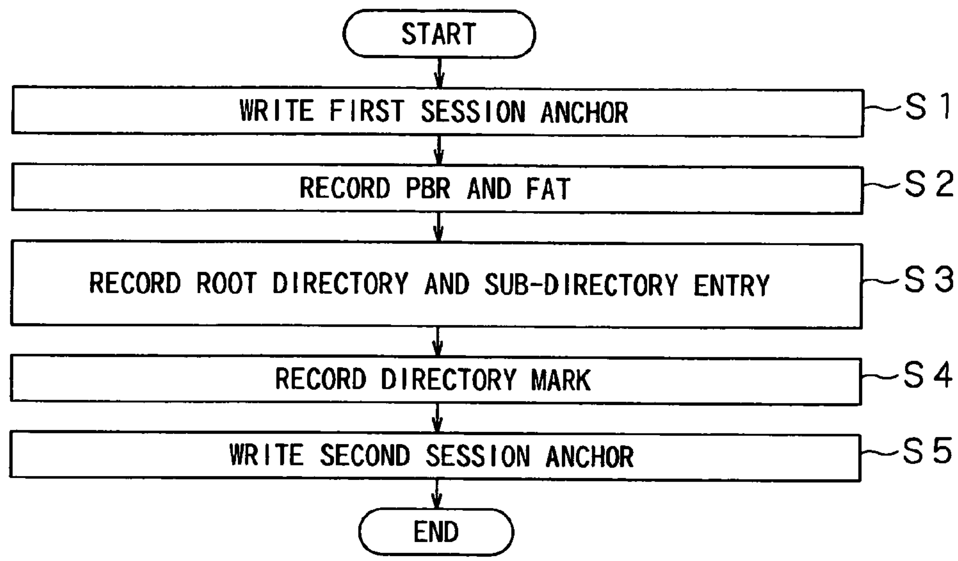
FIG.18
Root — MEMSTICK.ind
FIG.19
PRELIMINARY BLOCK
MANAGEMENT NUMBER
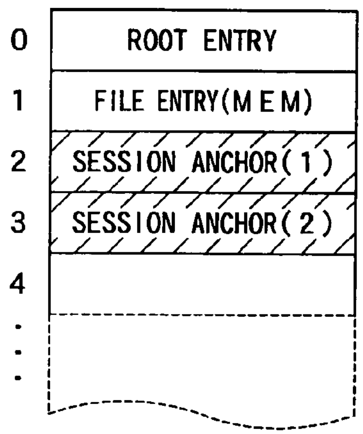
FIG.20

| PRELIMINARY BLOCK MANAGEMENT NUMBER | |
|---|---|
| 0 | ROOT ENTRY |
| 1 | FILE ENTRY(MEM) |
| 2 | SESSION ANCHOR(1) |
| 3 | SESSION ANCHOR(1) |
| 4 | FILE ENTRY(1) |
| 5 | FILE ENTRY(2) |
| 6 | SUB-ENTRY(1) |
| 7 | FILE ENTRY(3) |
| 8 | SESSION ANCHOR(2) |
| 9 | DIRECTORY MARKER(1) |
| 10 | SESSION ANCHOR(2) |

ADDED ENTRY PAGE

MEMORY DEVICE AND RECORDING AND/OR REPRODUCING APPARATUS USING THE SAME

TECHNICAL FIELD

This invention relates to a memory device including a recording medium capable of writing data only once on the bit basis, and a recording and/or reproducing apparatus employing this memory device.

This application claims priority of Japanese Patent Application No. 2001-392453, filed on Dec. 25, 2001, the entirety of which is incorporated by reference herein.

BACKGROUND ART

Up to now, as an external storage device for host equipment, such as portable information terminals, desktop computers, notebook computers, portable telephone sets, audio appliances or household electrical appliances, a card type small-sized removable IC memory, detachably mounted to these equipment and having enclosed therein a semiconductor memory, has been used.

This sort of the memory device has a nonvolatile semiconductor memory (IC memory), such as a flash memory, enclosed therein. In this semiconductor memory, various digital data, such as still image data, moving picture data, speech data or music data, are stored. The flash memory is a rewritable memory for repeatedly writing or erasing data. Thus, for the memory device, having enclosed therein the flash memory, a file management system of a routine hierarchical directory structure, exemplified by MS-DOS (trademark) format, premised on the use of the rewritable disc medium, may be used.

Meanwhile, the flash memory is a relatively costly device. Thus, by using a write-once type non-volatile semiconductor memory, such as PROM (programmable read-only memory), which is less costly than the flash memory, as a data storage device, a memory device can be fabricated at a lower cost.

If the write-once type non-volatile semiconductor memory is used in this manner as the data storage device for the memory device, it is more desirable for convenience to the user to supervise the files by the hierarchical directory structure, such as the MS-DOS (trademark) format, as in the case of the rewritable memory device employing the flash memory.

With the memory device, employing the write-once type semiconductor memory, as data storage device, it is not possible to erase the recorded entity data. For convenience to the user, the files etc. preferably can be pseudo-erased on the file management system.

Even in the memory device employing the write-once type semiconductor memory, as the data storage device, the readout processing itself is the same as that in the memory device employing the rewritable semiconductor memory. Thus, for convenience to the user, the physical structure and the file management system compatible with a conventional IC memory device, having the rewritable semiconductor memory, is desirable, insofar as data readout is concerned.

DISCLOSURE OF THE INVENTION

It is therefore an object of the present invention to provide a novel memory device whereby the problems inherent in the above-described conventional memory device may be resolved, and a recording and/or reproducing apparatus employing this memory device.

It is a further object of the present invention to provide a memory device employing a write-once type memory as a data storage medium and which is able to supervise files by a hierarchical directory structure, a file management method for this memory device, and a data recording and/or reproducing apparatus for recording and/or reproducing data for this memory device.

It is a further object of the present invention to provide a memory device of a physical structure in which a file etc. may be erased on the file system even with the use of a write-once memory as a data storage medium, and a data recording and/or reproducing apparatus for recording and/or reproducing data for the memory device.

The present invention provides a memory device comprising a recording medium in which data can be written only once on the bit basis and in which a logical address is provided in terms of a block as a predetermined data unit, wherein each block includes an area in which there is recorded a data use status flag indicating that data has been recorded in the block, and an area in which there is recorded a block status flag indicating that data recorded in the block has been deleted.

The present invention also provides a recording and/or reproducing apparatus having a recording and/or reproducing unit for recording and/or reproducing data for a recording medium of a memory device in which data can be written only once on the bit basis and in which a logical address is provided in terms of a block of a predetermined data volume as a unit to supervise a data recording area, each block having an area in which there is recorded a data use status flag indicating that data has been recorded in the block and an area in which there is recorded a block status flag indicating that data recorded in the block has been deleted. The recording and/or reproducing unit records a data use status flag in a block when data has been recorded in the block, records a block status flag in a block when the data recorded in the block is deleted on the block basis, verifies that data has been recorded in a block when the data use status flag has been recorded in the additional data recording area, and verifies that data in a block has been deleted when the block status flag has been recorded in the additional data recording area.

Other objects, features and advantages of the present invention will become more apparent from reading the embodiments of the present invention as shown in the drawings.

BRIEF DESCRIPTION OF THE DRAWINGS

FIG. 8 shows the relationship between a segment and a block and the relationship between the physical block number and the logical address as defined on the physical format of the memory card.

FIGS. 13A to 13F illustrate a species-based field image of the entry page.

FIG. 18 is a flowchart showing the processing sequence of session closing processing.

FIG. 19 shows the directory structure of the file recorded in the memory card at the time of the first session closure processing.

FIG. 20 shows a recording image of the entry page following the first session closure processing.

BEST MODE FOR CARRYING OUT THE INVENTION

The present invention is now explained taking an example of applying a memory device of the present invention to a small-sized card-shaped IC memory device, and an example of applying the present invention to a data processing apparatus employing this memory card as an external storage device.

The data processing apparatus, in which the memory card embodying the present invention is used as an external storage medium, may be exemplified by a desktop computer, a notebook computer, a portable telephone set, an audio appliance or a domestic electrical equipment.

In the following explanation, the data processing apparatus, employing the memory card, embodying the present invention, is termed a host equipment.

Figure 1:
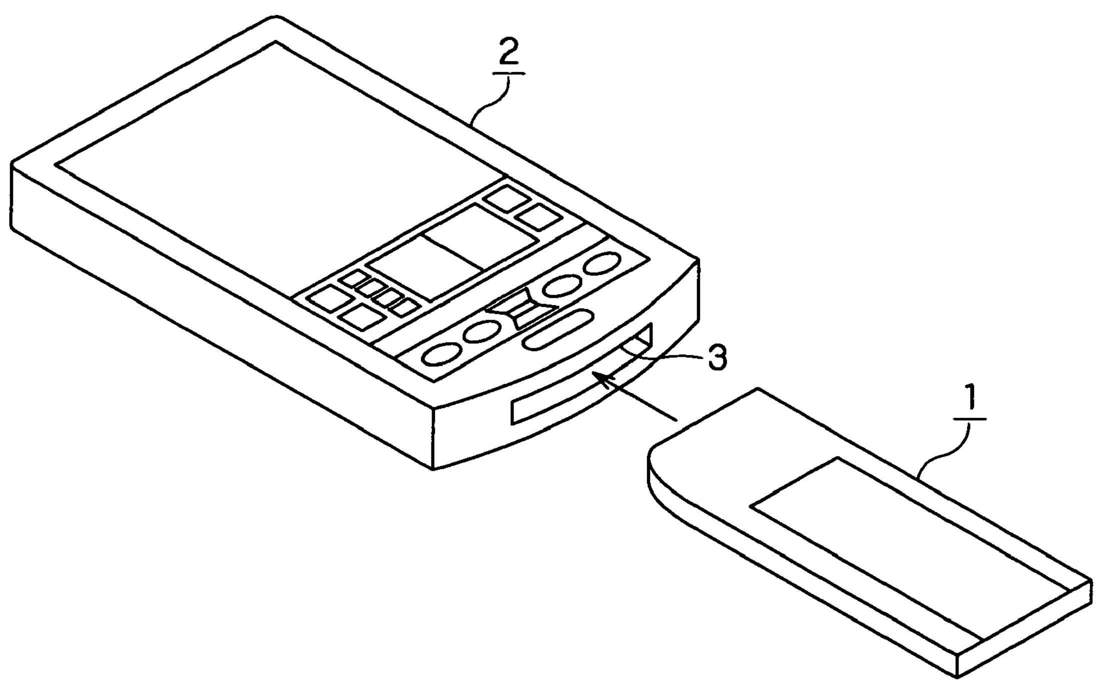
FIG. 1 is a perspective view showing a memory card embodying the present invention and a host equipment employing this memory card.

Referring first to FIG. 1, the schematics of a memory card 1 according to the present invention and a host equipment 2 employing this memory card as an external storage medium, are explained.

The memory card 1 according to the present invention has enclosed therein a non-volatile memory, which allows data writing only once, that is a write once type semiconductor memory, referred to below as write-once memory, as a data storage medium. The memory card 1 is used in a state it is inserted via an insertion/ejection opening 3, provided in the host equipment 2, as shown in FIG. 1. The memory card 1 may optionally be inserted or ejected at the insertion/ejection opening 3 by the user. Thus, the memory card 1, so far inserted in a given host equipment, may be extracted and inserted into another host equipment. That is, the present memory card 1 may be used for exchanging data between different host equipment.

Figure 2:
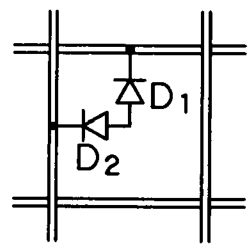
FIG. 2 shows the structure of a memory cell of the memory card.

The write-once memory, provided within the memory card 1, is a PROM (programmable read only memory) employing a diode destruction type memory cell capable of writing data on the bit basis. This diode destruction type memory cell is made up by pn diodes D1, D2, connected in series in opposite directions to each other across a line and a column, as shown in FIG. 2. In the diode destruction type memory cell, the value of the stored bit is inverted by reverse-biasing and thereby destructing one of the pn diodes. Meanwhile, for the write-once memory, used for the memory card 1, a so-called fuse type or a floating gate PROM may also be used in place of the diode destruction type cell.

In the write-once memory, used for the memory card 1, the bit value held by each memory cell is "1" (high) in an initial state. That is, if no data has been written, "1" is read out from each memory cell. If "0" (low) is written in this initial state memory cell, the pn diode is destructed, so that the value stored in the memory cell is changed to "0". If once the stored value of the memory cell is "0", the stored value is not changed if "1" or "0" is subsequently written in the memory cell, such that the state of "0" is maintained. If, on the other hand, "1" is written in the memory cell in the initial state, the stored value in the memory cell continues to be "1". Since the diode is not destructed in this state, "0" can subsequently be written in the memory cell.

In contradistinction from the memory card 1 of the present invention, described above, the conventionally proposed memory card has enclosed therein a non-volatile semiconductor memory, termed a flash memory, capable of being rewritten a number of times, as a data storage device. The memory card 1 according to the present invention is configured so as to be compatible with the conventional memory card employing the flash memory as to appearance, connection terminal, or data transfer interface with the host equipment. The memory card 1 according to the present invention can be used loaded on a host equipment employing the conventional memory card employing in turn a flash memory. Moreover, the host equipment 2, capable of employing the memory card 1 of the present invention, may use the conventional memory card, employing the flash memory, as an external storage medium. That is, the memory card according to the present invention is compatible with the conventional memory card, employing the flash memory, insofar as the interface is concerned.

The memory card according to the present invention is now explained in detail, as it is compared as necessary to the conventional memory card employing the flash memory.

If, in the following explanation, it becomes necessary to clarify the difference between the conventional memory card employing the flash memory and the memory card according to the present invention, the conventional memory card employing the flash memory and the associated host equipment are occasionally referred to as Ver1, while the memory card according to the present invention and the associated host equipment are occasionally referred to as Ver2.

Figure 3:
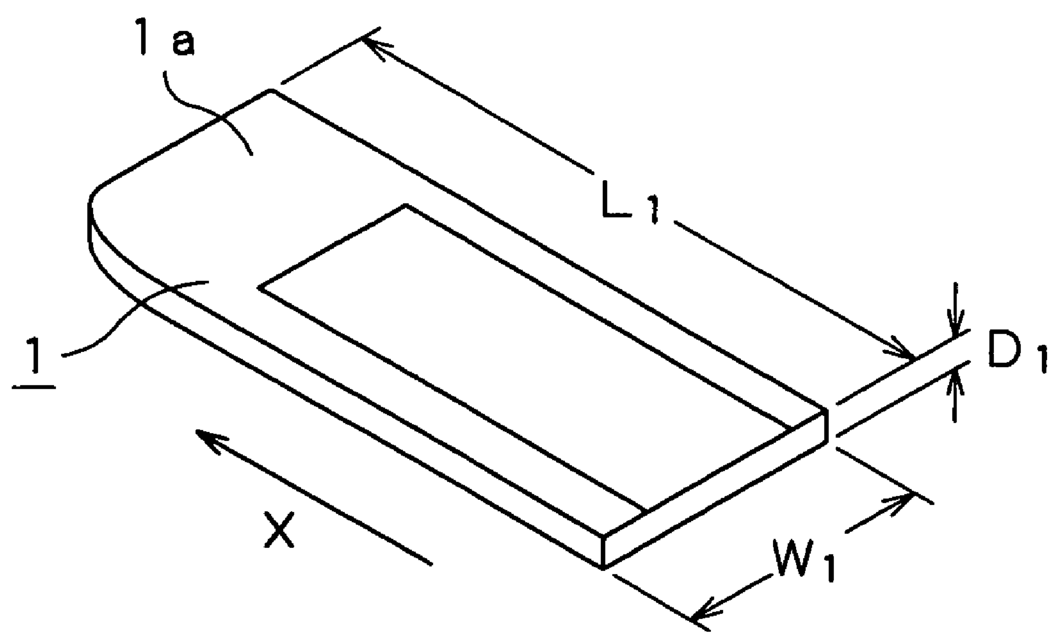
FIG. 3 is a perspective view showing the memory card from its front side.
Figure 4:
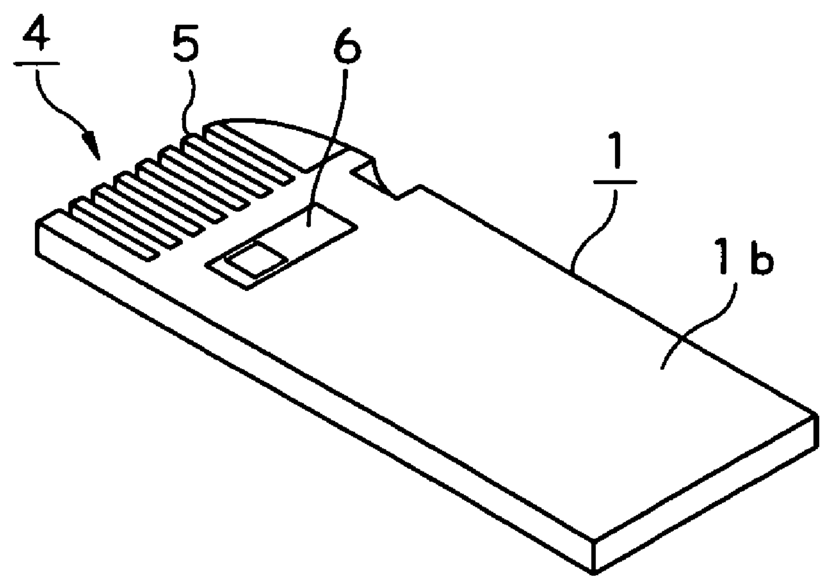
FIG. 4 is a perspective view showing the memory card from its reverse side.

The memory card 1 according to the present invention is formed as a substantially rectangular thin sheet with a longitudinal length $L_1$ equal to 50 mm, a width $W_1$ equal to 21.45 mm and a thickness $D_1$ equal to 2.8 mm, as shown in FIG. 3. The memory card 1 has one surface as a front side 1*a* and the opposite side surface as a reverse side 1*b*. On the reverse side 1*b* towards one longitudinal end of the memory card 1, there is provided a set of connection terminals 4, made up by ten planar electrodes, as shown in FIG. 4. The respective electrodes, constituting the set of connection terminals 4, are provided side-by-side along the width-wise direction of the memory card 1. Between the neighboring electrodes, there are formed partitioning pieces 5 upstanding from the reverse side 1*b*. The partitioning pieces 5 are used for preventing connection terminals connected to the respective electrodes from contacting with other electrodes. A slide switch 6 for prohibiting inadvertent erasure is mounted centrally of the longitudinal end of the reverse side 1*b* of the memory card 1, as shown in FIG. 4.

The host equipment 2, on which is loaded the above-described memory card 1, is provided with an insertion/ejection opening 3 for inserting/ejecting the memory card 1. The insertion/ejection opening 3 is formed on the front side of the host equipment 2 as an opening of a width and a thickness corresponding to the width $W_1$ and the thickness $D_1$ of the memory card 1, respectively, as shown in FIG. 1. The memory card 1, inserted into the host equipment 2 via the insertion/ejection opening 3, is held on the host equipment 2 against inadvertent descent by the respective electrodes of the set of connection terminals 4 being connected to connection terminal provided on the host equipment 2. Meanwhile, the connection terminals of the host equipment 2 are provided with ten terminals for mating with the num er of the electrodes of the set of connection terminals 4 provided on the memory card 1 loaded thereon.

The memory card 1 of the present invention is loaded through the insertion/ejection opening 3 on the host equipment 2, via one end provided with the set of connection terminals 4 as an inserting end, along the direction indicated by arrow X in FIG. 3 as the inserting direction. With the memory card 1 connected to the host equipment 2, signal exchange becomes possible by connection of the contacts of the connection terminals of the host equipment 2 with the respective electrodes of the set of connection terminals 4.

Figure 5:
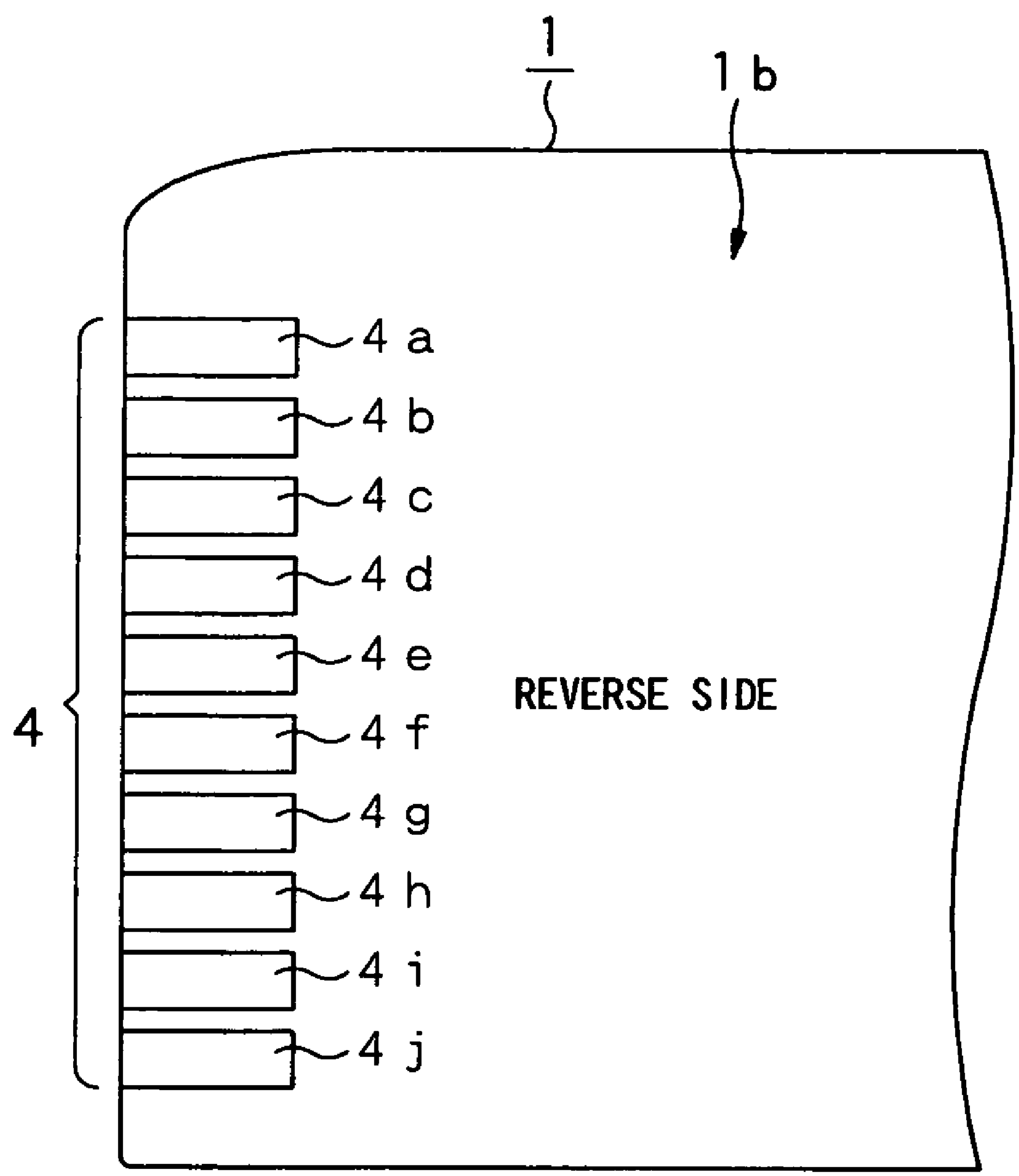
FIG. 5 illustrates a terminal structure of the memory card.

The functions of the ten terminals of the set of connection terminals 4, provided on the memory card 1 according to the present invention, is now explained with reference to FIG. 5.

The first terminal 4*a* of the set of connection terminals 4 is a VSS terminal to which is connected VSS (reference voltage of 0 volt). The first terminal 4*a*, as the VSS terminal, interconnects the ground of the host equipment 2 and the ground of the memory card 1 to match the 0 volt reference voltage of the host equipment 2 to that of the memory card 1.

The second terminal 4*b* forms a BS terminal such that a bus state signal is input from the host equipment 2 to the memory card 1.

The third terminal 4*c* forms the VCC terminal to supply the source voltage (VCC) from the host equipment 2 to the memory card 1. The source voltage which enables the operation of the memory card 1 is 2.7 to 3.6V such that the voltage in this voltage range is supplied.

The fourth terminal 4*d* forms a SDIO terminal for input/output of serial data signals transferred between the memory card 1 and the host equipment 2.

The fifth terminal 4*e* is a spare terminal for which no particular function is allocated.

The sixth terminal 4*f* forms an INS terminal and is used for insertion/extraction check for the host equipment 2 to check whether or not the memory card 1 has been inserted into the insertion/ejection opening 3.

The seventh terminal 4*g* is a spare terminal for which no particular function is allocated.

The eighth terminal 4*h* forms an SCLK terminal which allows the inputting of clock signals of serial data, transmitted between the memory card 1 and the host equipment 2, from the host equipment to the memory card.

The ninth terminal 4*i* forms a VCC terminal which allows the source voltage (VCC) to be supplied from the host equipment to the memory card. The ninth terminal 4*i* is connected to the third terminal 4*c* within the inside of the memory card 1.

The tenth terminal 4*j* is used as a VSS terminal and connects the ground of the host equipment 2 to the ground of the memory card 1 to establish the matching of the 0-volt reference potential between the host equipment 2 and the memory card 1. The tenth terminal 4*j* is connected to the first terminal 4*a*, similarly used as a VSS terminal, within the inside of the memory card 1.

Meanwhile, the terminal structure of the memory card 1 of the present invention, the shape of the insertion/ejection opening 3 of the host equipment 2 to which the memory card 1 is loaded (Ver2) and the structure of the connection terminal are similar in structure to those of the conventional memory card employing the flash memory and the host equipment employing the conventional memory card (Ver1), in order to assure mechanical compatibility.

The internal circuit of the memory card 1 according to the present invention is hereinafter explained.

Figure 6:
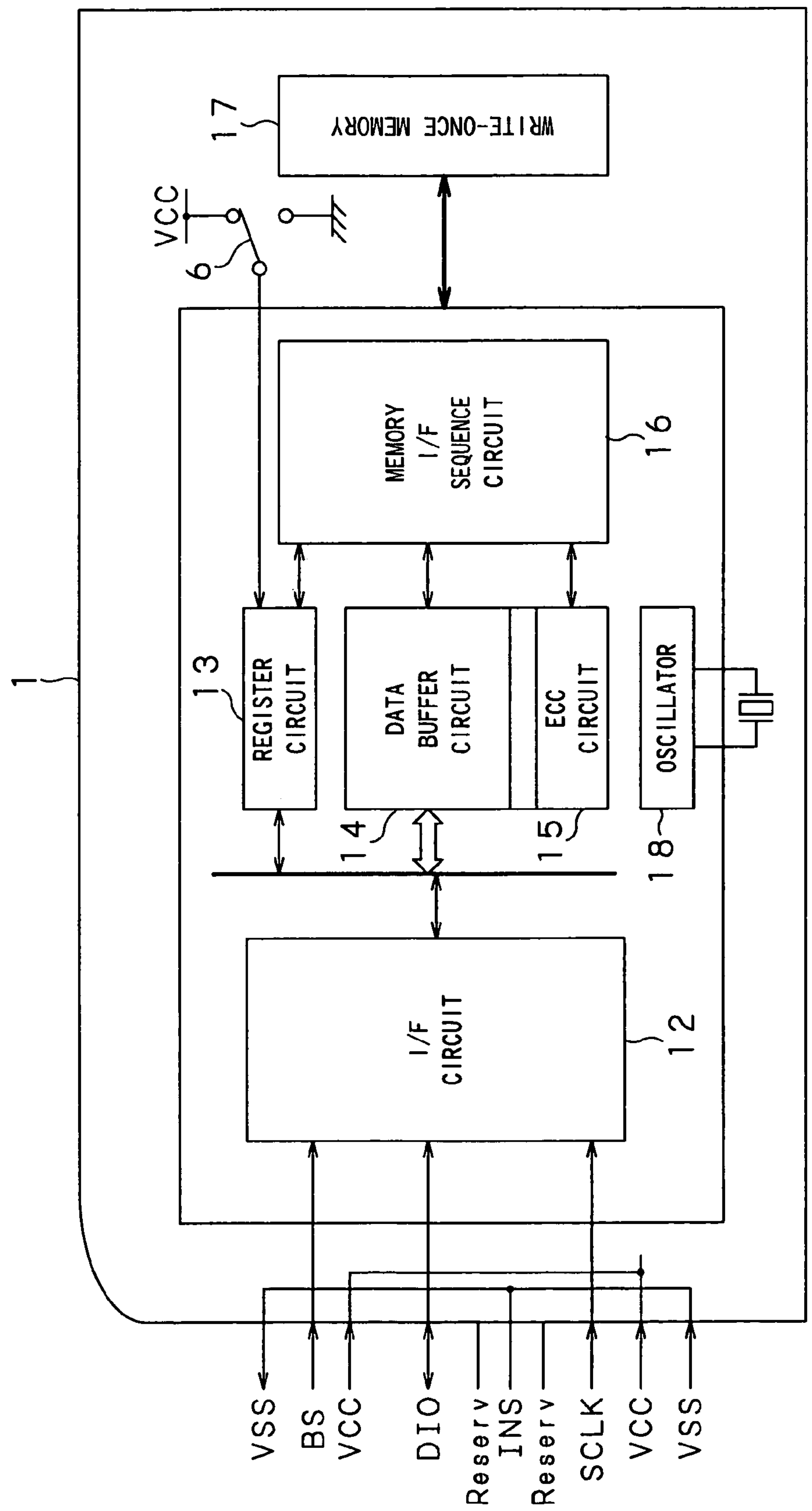
FIG. 6 is a block diagram showing an internal circuit of the memory card.

Referring to FIG. 6, the memory card 1 according to the present invention includes an interfacing circuit (I/F) 12, a register circuit 13, a data buffer circuit 14, an ECC circuit 15, a memory I/F sequence circuit 16, a write-once memory 17 and an oscillation control circuit 18.

The I/F circuit 12 transfers data between it and the host equipment 2, using the three-wire half-duplex serial protocol.

The register circuit 13 is a circuit for storage of, for example, a command transferred from the host equipment, the inner state in the memory card 1, addresses of data to be accessed, various parameters needed in executing a command, the file management information in the write-once memory 17 and so forth. The information stored in the register circuit 13 is accessed from the memory I/F sequence circuit 16 or accessed by issuing a predetermined command from the host equipment 2.

The data buffer circuit 14 is a memory circuit for transiently holding data written in the write-once memory 17 and data read out from the write-once memory 17. The data buffer circuit 14 has a data capacity corresponding to a predetermined data writing unit (512 bytes which is a page size as later explained).

The ECC circuit 15 adds an error correction code (ECC) to the data written in the write-once memory 17. The ECC circuit 15 corrects data read out from the write-once memory 17 for errors, based on the error correction code appended to data read out from the write-once memory 17. For example, three bytes of the error correction code are appended to a data unit of 512 bytes.

The memory I/F sequence circuit 16 controls data exchange between the data buffer circuit 14 and the write-once memory 17 in accordance with the various information or the commands stored in the register circuit 13.

The write-once memory 17 is a semiconductor memory capable of re-writing stored data only once, as explained previously.

The oscillation control circuit 18 generates operating clocks within the present memory card 1.

The memory card 1, constructed as described above, effects data writing, data readout or data erasure (erasure on the file system) in accordance with for example the various commands sent from for example the host equipment 2 over an interface.

The system configuration, providing for interfacing between the memory card 1 and the host equipment 2, is hereinafter explained.

Figure 7:
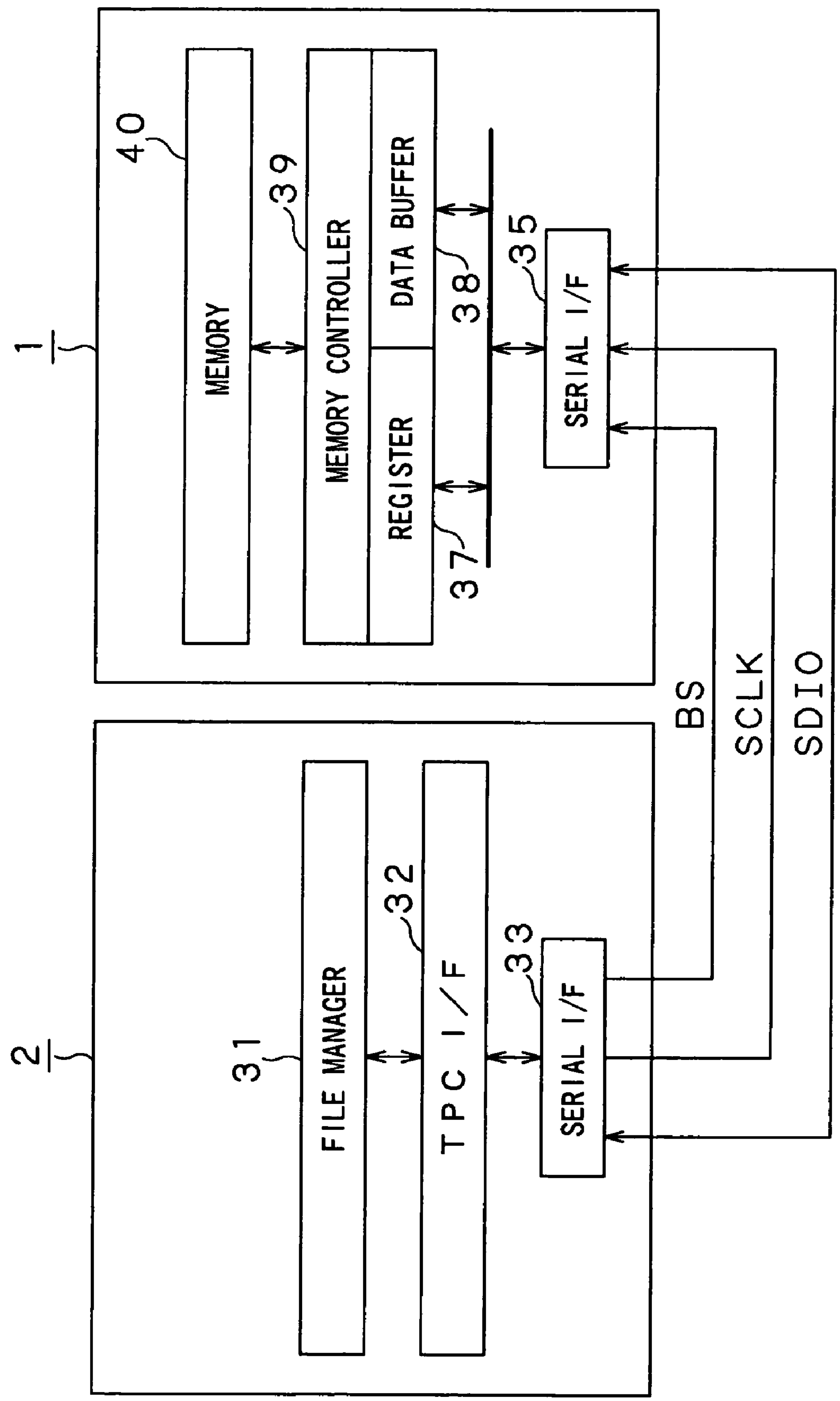
FIG. 7 illustrates an interfacing structure of the memory card.

FIG. 7 shows the functional structure of the interface for data transmission between the memory card 1 and the host equipment 2 according to the present invention.

The host equipment 2 includes a file manager 31, a TPC interface 32 and a serial interface 33. The memory card 1 includes a serial interface 35, a register 37, a data buffer 38, a memory controller 39 and a memory 40.

The file manager 31 supervises a file stored in the memory card 1, and a file stored in other mediums of the host equipment.

The TPC interface 32 becomes a lower layer of the file manager 31. The TPC interface 32 accesses the register 37 and the data buffer 38 in the memory card 1 by a command peculiar to the interface of the present memory card 1 (TPC: Transfer Protocol Command).

The serial interfaces 33, 35 become lower layers of the TPC interface and represent physical hierarchies of the present interfacing system. The serial interfaces 33,35 effect data transfer in accordance with the three wire half duplex serial protocol transmitting three signals, namely 1-bit serial data, clock signals and bus state signals.

The register 37 stores commands transmitted from the host, the inner states of the memory card, memory data addresses, various parameters needed in executing the commands, the file management information in the memory and so forth.

The data buffer 38 is a buffer area in which data written in the memory 40 or data read out from the memory 40 is to be stored transiently.

The memory controller 39 controls the data exchange between the data buffer 38 and the memory 40, to read out and write data, in accordance with the various information and commands stored in the register circuit 13.

The memory 40 is a memory area for data and is rendered a virtual memory by the memory controller 39 as a unique model.

The host equipment 2 and the memory card 1, constructed as described above, is able to transfer data, stored in other mediums supervised by the file manager 31 over a serial interface to the memory 40, and to transfer the data stored in the memory 40 over the serial interface to other mediums, supervised over the serial interface by the file manager.

Meanwhile, the interface structure and the data transfer protocol of the memory card 1 according to the present invention (Ver2) are the same as and compatible with the conventional memory card employing the flash memory (Ver1).

The physical format of the data storage area of the memory card 1 according to the present invention is now explained.

The data capacity of the memory card 1 (data that can be stored by the memory card 1) is e.g. 16 Mbytes, 32 Mbytes, 64 Mbytes or 128 Mbytes.

The memory card 1 defines a data unit termed a block and the data storage area is physically supervised in terms of this block as a unit. The one-block data size is e.g. 16 Kbytes. Thus, with the memory card with 16 Mbyte, 32 Mbyte, 64 Mbyte or with 128 Mbyte, the total number of blocks is 1024, 2048, 4096 or 8192, respectively. This block is the same as an erasure block in a conventional memory card employing the flash memory.

The block is classed into an effective block and a spare block. The effective block is a block in which deferred reject substitution data and data for file management are recorded. The total number of spare blocks in one memory card 1 is 31, 63, 127 and 255 for memory cards with 16 Mbyte, 32 Mbyte, 64 Mbyte and 128 Mbyte, respectively.

In each block, the physical block number, specifying the storage location of the block, is set. This physical block number is a serial number, beginning from 0, without regard to whether a block in question is an effective block or a spare block.

A logical address is recorded in each block. This logical block is written in a predetermined area in the block. For the effective block, the logical address is pre-recorded e.g. at the time of shipment from a plant, whereas, for the spare block, no logical address is recorded at the time of shipment. If malfunction has occurred later in a block of a specified logical address, the logical address of the malfunctioning block is written in the non-recorded spare block by way of substitution. That is, the logical address as well as the physical block number is pre-set for the effective block, whereas, for the spare block, the logical address is set following shipment from the plant.

In the memory card 1, a set of 512 blocks is defined as a segment. The segment number is set by serial numbers beginning from zero. Each segment is made up by effective blocks and spare blocks. The number of effective blocks of a 0 segment is 495, with the number of the spare blocks being 15. The number of effective blocks of each of the remaining segments is 496, with the number of the spare blocks being 16. The smaller number of the effective blocks and that of the spare blocks in the 0 segment is ascribable to the provision of a boot block as later explained.

The relationship between the segment and the block and the relationship between the physical block number and the logical address, described above, are as shown in FIG. 8.

Figure 9:
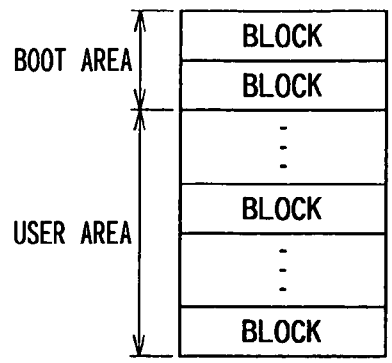
FIG. 9 illustrates a boot area and a user area as defined on the physical format of the memory card.

The two leading blocks of the 0 segment, that is the blocks with the physical block numbers of "0" and "1", is a boot area, as shown in FIG. 9. It is noted that no logical address is recorded for these blocks. The boot area is an area in which data is initially read in when the host equipment has booted the memory card 1. In the blocks of this boot area are recorded the information and the attribute pertinent to the memory card. The area in which the boot has been recorded is termed a boot area, while the other area is termed a user area.

Figure 10:
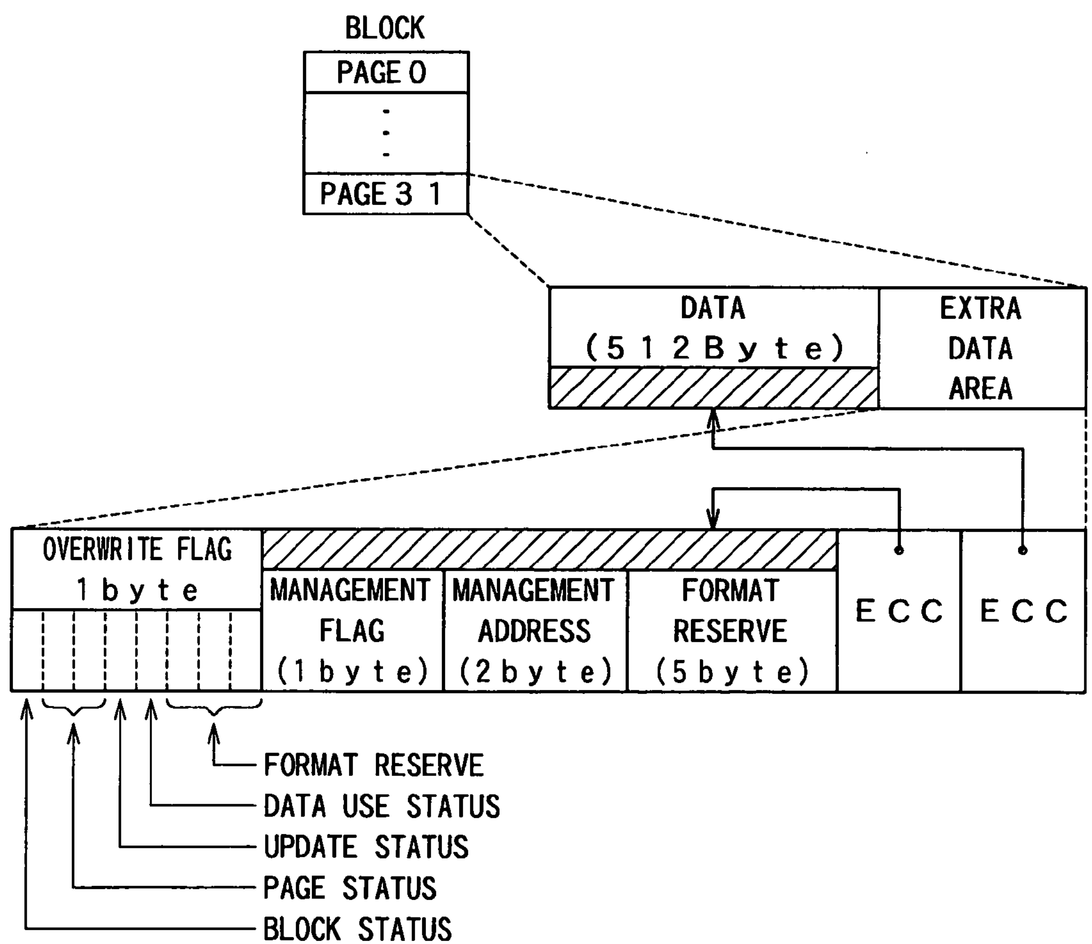
FIG. 10 illustrates a page as defined on the physical format of the memory card.

Each block is made up by 32 pages, as shown in FIG. 10. The page is a unit made up by a data area of 512 bytes and an extra data area. In the data area, data entity, that is the entity data and the management data of the file, are recorded.

The extra data area is made up by a 1 byte (8 bits) of an overwrite flag area, a 1-byte of a management flag area, 2-bytes of the logical address area, 5 bytes of a format reserve area, a first ECC area and a second ECC area, beginning from the leading end.

In the overwrite flag area, a block status, a page status, an update status and a data use status are recorded in the first bit, second and third bits, fourth bit and in the fifth bit, beginning from the leading end, respectively. The sixth to eighth bits are a reserve area.

The block status is a 1-bit discriminating flag specifying whether or not the block containing the page is malfunctioning, or whether or not the data recorded in the block containing the page has been deleted. The block status with a value of "0" indicates that the block is in the malfunctioning state or in the data-deleted state, while that with a value of "1" indicates that the block is in an accessible state. This block status is "1" in the initial state such as at the time of shipment from the plant. If the block is malfunctioning, or if the data written in the block is pseudo-erased on the file management system, the block status value is rewritten to "0".

The page status is a two-bit discrimination flag indicating the status of occurrence of uncorrectable errors on the page basis. If the value of the page status is "00", it indicates that the data in the page is suffering from errors correctable by ECC, whereas, if the value of the page status is "01", it indicates that the data in the page is suffering from errors uncorrectable by ECC and, if the value of the page status is "11", it indicates that the no errors are occurring in the data within the page.

The update status is a 1-bit flag indicating the update state of the block containing the page. The update state having a value of "0" indicates that the data of the block is in the recorded state or that the data in the block is being updated, while the update state having a value of "1" indicates that no data has been recorded in the block.

The data use status is a 1-bit discrimination flag indicating that data has been recorded in the block containing the page and that the block is already being used. The data use status having a value of "0" indicates that data has already been recorded in the block, while the data use status having a value of "1" indicates that no data has been recorded in the page.

In the management flag, there are included a system bit indicating whether the block containing the page is the boot block or other blocks, a copy limiting bit for the page, an access limiting bit for the page, and so forth.

In the logical address, the address information for the block is recorded.

The first ECC is an error correction code for the one-byte management flag, a two-byte logical address and an error correction code for the five-byte format reserve.

The second ECC is an error correction code for the 512-byte page data.

The physical format of the memory card 1 according to the present invention has the following configuration.

When compared to the physical format of the conventional memory card employing the flash memory and which can be rewritten a plural number of times, the physical format of the memory card 1 has the same basic configuration as the physical format of the conventional memory card. However, the physical format of the memory card 1 according to the present invention differs from the physical format of the conventional memory card in the fact that the data use status has been defined in the physical format of the memory card 1. That is, in the present memory card 1, the fifth bit in the overwrite flag area is a data use status, whereas, in the conventional memory card employing the flash memory and which can be rewritten a plural number of times, the fifth bit of the overwrite flag area is a reserve.

With the memory card 1 of the present invention, in which the data use status and the block status are defined by the physical format as described above, it is possible to distinguish three states, that is a state in which no data has been recorded in the block, a state in which data has been recorded in the block and a state in which data recorded in the block has been erased. Thus, even with the write-once type memory card 1, the data erasure state can be pseudo-managed as long as the file management system is concerned.

In the memory card 1, in which the new data use flag is defined in the reserve area of the conventional memory card employing the flash memory and which can be rewritten a plural number of times, data readout compatibility may be afforded as long as the physical format is concerned. That is, the contents of the data use status, defined only for the present memory card 1, do not affect the conventional memory card.

Among the information recorded in an extra data area in the page, there are the information indicating contents inherent from block to block and the information indicating the contents inherent from page to page. The block status, update status, data use status and the logical address represent the information indicating the contents inherent from block to block. The page status and the management flag represent the information indicating the contents inherent from page to page. That is, the information contents of the block status, update status, data use status and the logical address remain the same for the totality of pages in the same block. Thus, these information may be recorded only in the leading page in the block.

Meanwhile, as long as the physical format is concerned, the memory card 1 of the present invention is not provided with an area in which to record a table correlating the physical block number with the logical addresses. Thus, in booting the memory card 1, the host equipment accesses the leading pages of all blocks to detect logical addresses to formulate a table correlating the physical address numbers with the logical addresses.

The logical format of the memory card 1 according to the present invention is now explained.

The conventional memory card, employing the flash memory, and which can be rewritten a plural number of times, uses the MS-DOS compatible format as the logical format. The MS-DOS compatible format is a file system supervising data files recorded on a recording medium in accordance with a hierarchical directory structure. The MS-DOS compatible format in supervising the recorded data provides for a recording and/or reproducing unit (cluster) for the recording medium. With the conventional memory card, the data recording and/or reproducing unit (cluster) provided for by the MS-DOS is a block.

On the other hand, the write-once type memory card 1 of the present invention manages files by both a unique logical format different from the MS-DOS compatible format, referred to below as the write-once format, and the MS-DOS compatible format. Similarly to the MS-DOS compatible format, the write-once format supervises the files in accordance with the hierarchical directory structure.

The host equipment 2 of the present invention, which enables the use of the memory card 1 according to the present invention (Ver2), records and/or reproduces data for the memory card 1 in accordance with the write-once format. On the other hand, the conventional host equipment, constructed with a view to employing the conventional memory card (Ver1), records and/or reproduces data for the memory card 1 in accordance with the MS-DOS compatible format. In the memory card 1 according to the present invention, data is recorded by the host equipment conforming to the memory card 1 (Ver2), while data management is not performed in accordance with the MS-DOS compatible format. In reading out data, recorded on the memory card 1 according to the present invention, by the host equipment conforming to the conventional memory card (Ver1), session closure processing for recording the management data of the MS-DOS compatible format is performed. By performing this session closure processing, readout compatibility with the conventional equipment is achieved.

The memory card 1 according to the present invention is able to perform session closure processing a plural number of times. That is, even after the session closing processing is carried out once, file post-write or update operations may be carried out in accordance with the write-once format. Moreover, by carrying out the session closing operation again, the file processed with post-write or update operations may be read out by the equipment conforming to the conventional memory card (Ver1).

The write-once format applied to the present memory card 1 and the session closing processing is hereinafter explained.

With the write-once format, the file entity data is recorded in the block to which the logical address is pre-allocated, that is the effective block. With the write-once format, the file entity data is recorded on the block basis. That is, recording is made so that entity data of plural files are not present together in one block. With the write-once format, recording of the file entity data is commenced from the leading page of the block. If, with the write-once format, entity data of a file is recorded over plural blocks, the recording is made for blocks having consecutive logical addresses. The direction of the consecutive logical addresses is the forward direction, that is the direction continuously proceeding from a smaller number towards a larger number. If a subdirectory entry in the MS-DOS compatible format, for example, is recorded on the way such that entity data of a file cannot be recorded in a sole area where there is a continuum of the logical addresses, the file entity data can be recorded in two partitions. Even in such case, the respective areas in the two partitions are formed by blocks in each of which there persists a continuum of the logical addresses.

It is noted that, with the MS-DOS compatible format, the file entity data can be recorded at random on the cluster basis. If the entity data is recorded in accordance with the above-described write-once format rule, recording may be made at least on the cluster (block) basis. Consequently, the file entity data, recorded in accordance with the write-once format, has also been recorded in accordance with the MS-DOS compatible format.

With the write-once format, the file entity data is recorded in an area where there persists a continuum of logical addresses, so that accessing may be made without the necessity of recording the information indicating the cluster connecting sequence, such as FAT (File Allocation Table), as management data.

In the write-once format, the management data, termed an entry page, is recorded in a block where the logical addresses are not pre-allocated (a block where the value of the logical address is not an initial value (0×FFFF)), that is in a spare block. In the write-once format, one entry page is generated and recorded in the spare block each time a file is generated or updated or each time one root directory and one sub-directory are generated. The entry page has a capacity of one page. Thus, one page of the spare block is consumed each time the file, root directory or the sub-directory is generated or updated.

In the write-once format, spare block management numbers are set for all pages of the totality of the spare blocks. Since the number of pages within one block is 32, the total number of pages for which the spare block management numbers are set is 992, 2046, 4064 and 8160 for memory cards of 16 Mbyte, 32 Mbyte, 64 Mbyte and 128 Mbyte, respectively.

Figure 11:
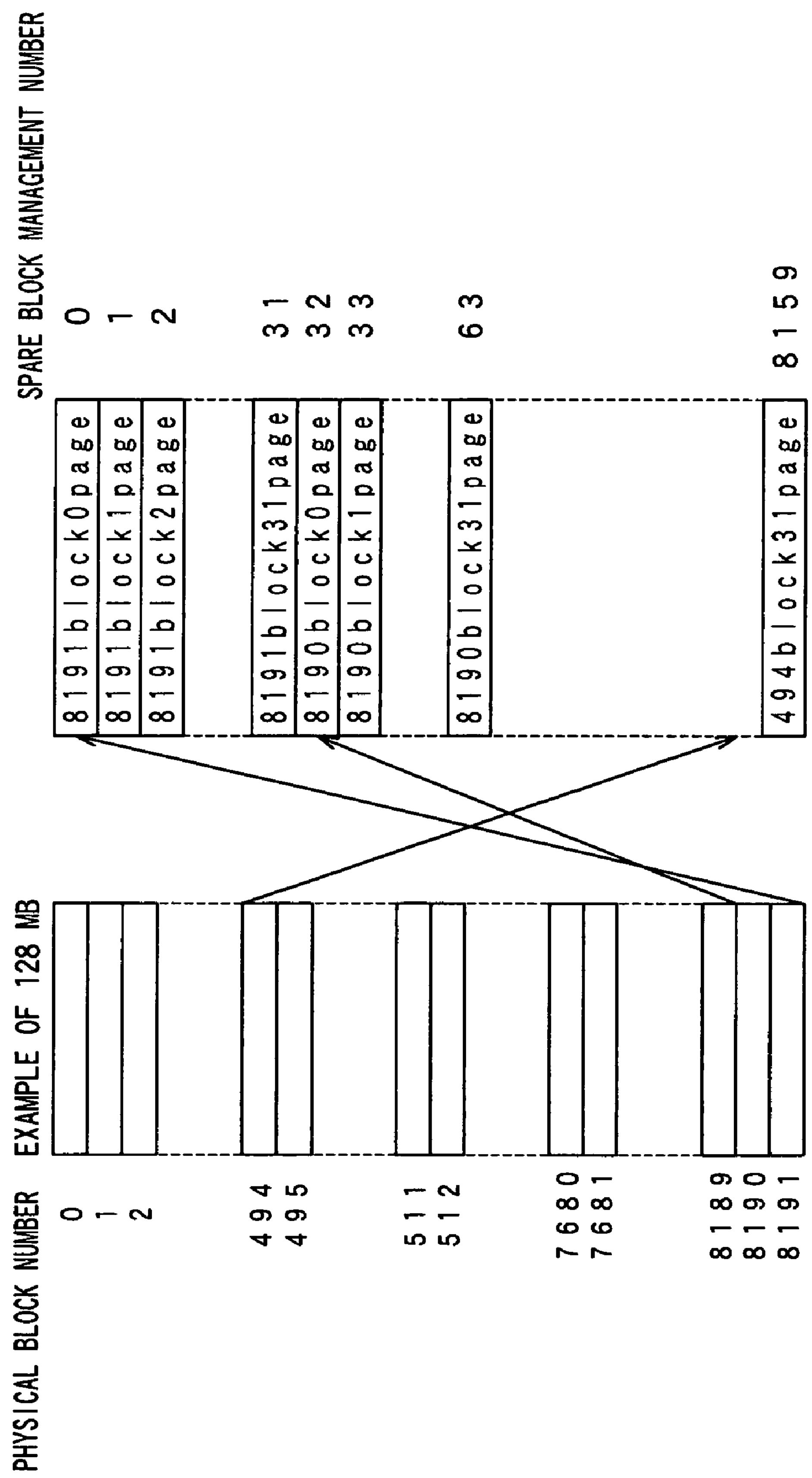
FIG. 11 illustrates a preliminary block management number as defined on the physical format of the memory card.

Referring to FIG. 11, the spare block management numbers are set from the spare block of the physical block number of the lowermost order (that is, the spare block with the largest physical block number) towards the spare block of the physical block number of the uppermost order, among the totality of the spare blocks. For the memory card 1 of 128 Mbyte, for example, the spare block management numbers are set as shown in the following table.

TABLE 1

| spare block management numbers | segment numbers | physical block numbers | page numbers |
|---|---|---|---|
| 0 | 15 | 8191 | 0 |
| 1 | 15 | 8191 | 1 |
| 2 | 15 | 8191 | 2 |
| 3 | 15 | 8191 | 3 |
| — | — | — | — |
| 31 | 15 | 8191 | 31 |
| 32 | 15 | 8190 | 0 |
| 33 | 15 | 8190 | 1 |
| 34 | 15 | 8190 | 2 |
| — | — | — | — |
| 63 | 15 | 8190 | 31 |
| 64 | 15 | 8189 | 0 |
| — | — | — | — |
| 511 | 15 | 7680 | 31 |
| 512 | 14 | 7679 | 0 |
| 513 | 14 | 7679 | 1 |
| — | — | — | — |
| 8158 | 0 | 494 | 30 |
| 8159 | 0 | 494 | 31 |

In the write-once format, the entry pages are recorded in the sequence conforming to the above spare block management numbers, each time one file etc. is generated or updated. That is, the entry pages are recorded in the reverse direction to the usual recording direction of the entity data, that is, beginning from the rearmost spare block in the memory card 1.

The entry pages are now explained.

The entry pages are classified into five categories, that is, a file entry, a root entry, a sub-entry, a session anchor and a directory marker.

The file entry is management data for specifying a file recorded on the memory card 1. When a file is recorded in the memory card 1, a file entry is recorded in the spare block in association with the so recorded file. In the file entry are stated the name of the file specified by the file entry, the attribute of the file, recording position information of the entity data of the file, the date of generation of the file, a parent pointer and a fragment. The parent pointer is a spare block management number for a spare block where there are recorded a root entry or a sub-entry specifying the parent directory of the file. The fragment is the information indicating that the entity data of a file is not recorded in a continuous region but is recorded in a fragmented condition. This fragment also indicates a start address for a recording area of a subsequent stage.

The root entry is management data specifying a root directory. The root directory is the uppermost directory in a hierarchical directory structure. In file management by the hierarchical directory structure, only one root directory is provided and remains unaltered. It is therefore desirable that one such root directory is previously recorded, at the time of plant shipment, in a leading page of the spare block management number.

The sub-entry is the management data specifying a sub-directory. The sub-directory means any directory in the hierarchical directory structure other than the root directory. The sub-directory may be placed below the root directory or below another sub-directory. If one such sub-directory is generated in the memory card 1, one sub-directory is recorded in the spare block in association with the so generated sub-directory. In the sub-entry, there are stated the name of the sub-directory specified by the sub-entry, the date of generation of the sub-directory, and the information specifying the parent directory for the sub-directory.

The session anchor is the management data indicating that session closure processing has been performed. A pair of the session anchors specify that one session closing processing has been carried out. When a session closing processing is commenced, one session anchor is first recorded in a spare block and another session anchor is recorded in the spare block at the end of the session closure processing. In this session anchor, there is recorded the information on the number of times of the session closure processing performed on the memory card 1. Since the same value is recorded in the paired session anchors, the session anchor pair may be identified when reading out the file entry. The session anchor is recorded at the time of beginning and the end of the session closure processing, in this manner, so that, when the power supply is turned off during the session closure processing, such that the session closure has resulted in a failure, only one session anchor is recorded, thus allowing late recognition of the fact of failure of the session closing processing.

The directory marker indicates a recording position of the sub-directory entry which is the management data of the MS-DOS compatible format generated as a result of the session closing processing. This directory marker is recorded, in the session closing processing, after recording the first session anchor and before recording the second session anchor. That is, the directory marker is recorded in a page sandwiched between the paired session anchors. One such directory marker is recorded for one sub-directory entry newly recorded at the time of session closing. It should be noted that, if one sub-directory entry is recorded over plural blocks, a number of the directory markers corresponding to the number of the blocks is recorded for one sub-directory entry.

Figure 12:
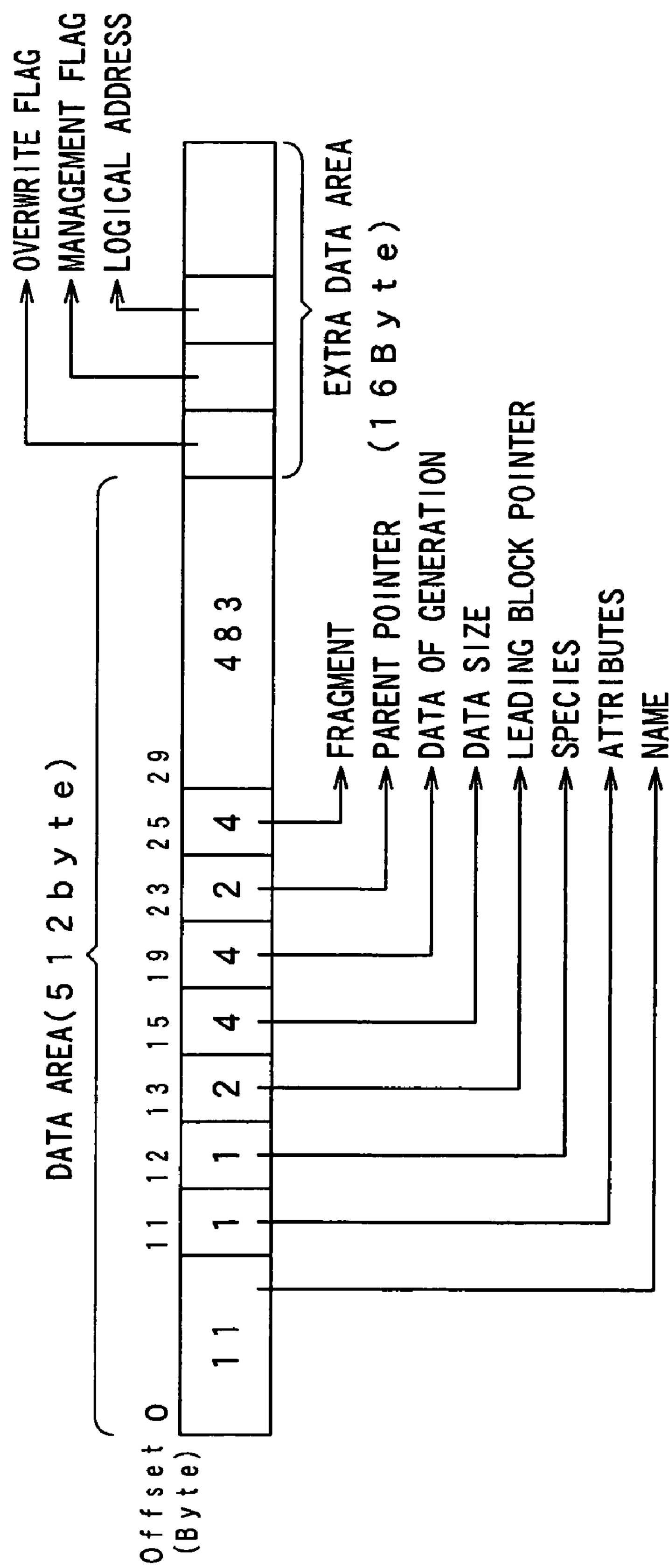
FIG. 12 illustrates an entry page as defined on the physical format of the memory card.

The structure of the entry page is now explained in detail. The entry page is recorded in a 152-byte data area in the page, as shown in FIG. 12.

A description field in the entry page is made up by a name field, a file attribute field, a species field, a leading block pointer field, a data size field, a generation date field, a parent pointer field, a fragment field and a reserve field.

The name field is arrayed in 0'th to tenth bytes. If the entry field is the file entry or the sub-entry, the name of the file specified by the entry page or the name of the sub-directory is recorded in the field. When stating the name of the file and the sub-directory, it is stated with a letter string that is usable in the MS-DOS format.

It is noted that, if the filename is a long filename, prescribed by the MS-DOS compatible format, "0" is recorded in the leading one byte of the name field. The filename data length is stated in the next following two bytes, while the filename is recorded in the reserve field. If the entry page is the root entry or the directory marker, the name field is void.

If the entry page is the session anchor, a pair discrimination ID, indicating the number of times of the session closing processing performed on the memory card 1, is recorded in the 0'th to first byte of the name field. The pair discrimination ID is incremented in the order of 1→2→3 . . . depending on the number of times of the session closing processing performed on the memory card 1. The maximum number of the number of times of the session closing processing is 8, such that the pair discrimination ID stated is only up to 8. Meanwhile, if the number of times of the session closing processing is less than 8, and the post-write capacity of the memory card 1 itself has become depleted, the pair discrimination ID is 256 (0×FFFF).

The attribute field is arrayed at the 11th byte. If the entry page is the file entry, the attribute of the file specifying by the file entry is stated in the attribute field. In the attribute field, "0", "1", "2", and "3" are stated if the file attribute is the normal file, read-only file, a hidden file or a volume label, respectively. The attribute file is void if the entry page is different than the file entry.

The species field is arranged at the 12th byte. In this species field, the species of the entry page is stated. That is, the information as to whether the entry page is the file entry, root entry, sub-entry, session anchor or the directory marker is stated. If the entry page is the file entry, root entry, sub-entry, session anchor or the directory marker, "0", "1", "2", "3" or "4" is stated, respectively, in the species field.

The leading block pointer field is arrayed at the 13th and 14th bytes. If the entry page is the file entry, the logical address of the leading block, where there is stored the file entity data, is stated in the leading block pointer field. If the entry page is the root directory, the logical address of the block, where the root directory entry of the MS-DOS compatible format is stored, is stated in the leading block pointer field. If the entry page is the sub-entry or the session anchor, the leading block pointer field is void. If the entry page is the directory marker, the logical address of the block, specified by the directory marker, is stated in the leading block pointer field.

The data size field is arrayed at the 15th to 18th bytes. If the entry page is the file entry, the size of the entity data of the file specified by the file entry is stated on the byte order in the data size field. If the entry page is the directory marker, the first one of entries recorded in the block specified by the directory marker is stated in the 0'th and the first byte of the data size field, whereas, in the second and third bytes thereof, the last one of entries stated in the block is stated.

The date of generation field is arrayed in the 19th to 22nd bytes. In the date of generation field, the date of generation of the file or the directory is stated, if the entry page is the file entry, root entry or the sub-entry. The statement of the date of generation field is to be the same as that of the MS-DOS format. If the entry page is the session anchor or the directory marker, the date of generation field is void.

The parent pointer field is arrayed at the 23rd and 24th bytes. If the entry page is the file entry or the sub-entry, a parent pointer is stated in the parent pointer field. The parent pointer is the spare block management number of the route entry or the sub-entry specifying the parent directory. If the entry page is the root entry, the parent block management number of the own entry is stated in the parent pointer.

The fragment field is arrayed in the 25th to 28th bytes. In the fragment field, the information is recorded only when the entry page is the file entry. The basis of the present write-once format is that the file entity data is stored in the successive logical addresses. However, as an exceptional case, the data is fragmented into two chunks. In such case, that is when the file entity data is fragmented into two chunks, a flag indicating that effect is stated in the fragment field. Specifically, if the file entity data is fractionated, 0 (0×0000) is stated in the 0'th and first ones of the four bytes, whereas, if the file entity data is not fractionated, data other than 0 is stated in the 0'th and first bytes. If the file entity data is fractionated, the logical address of the leading block where the latter portion of the file entity data is recorded is stated in the second and third bytes.

The species-based image diagrams of the respective entry pages are depicted in FIGS. 13A to 13F. Specifically, FIGS. 13A to 13F are image diagrams of a file entry, a file entry (long file name), a root entry, a sub-entry, a session anchor and a directory anchor, respectively.

Figure 14:
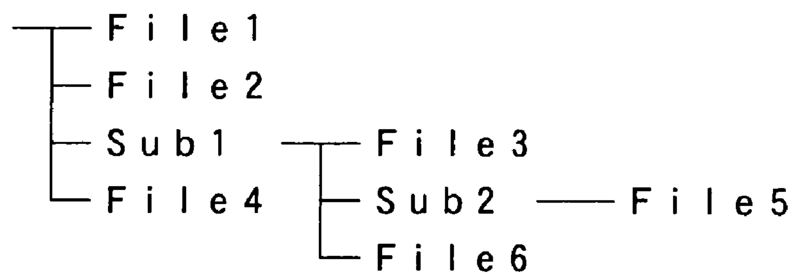
FIG. 14 shows an illustrative directory structure of for example a file recorded on a memory card.
Figure 15:
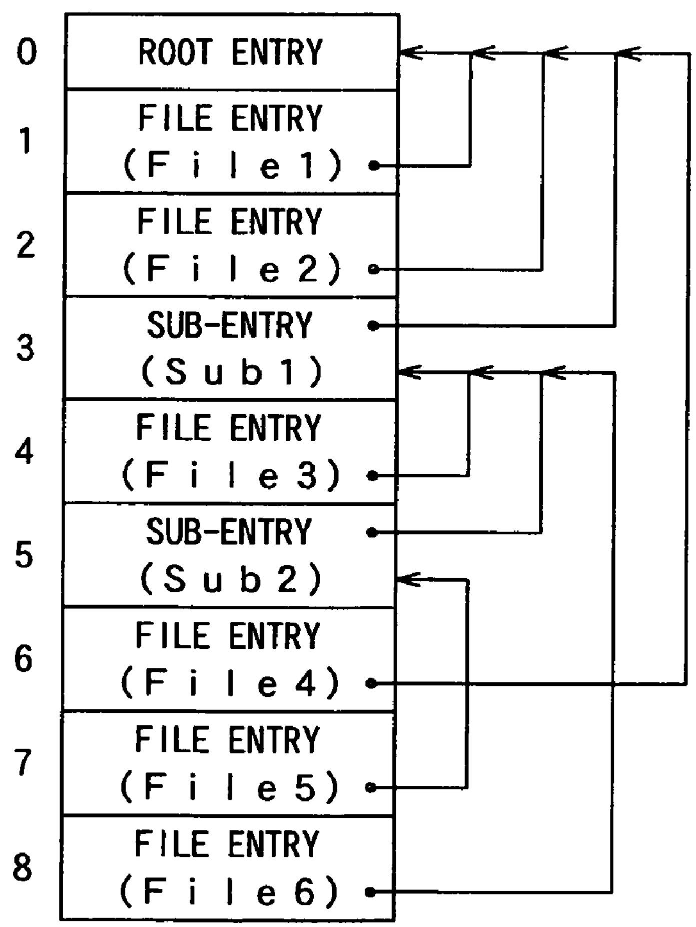
FIG. 15 shows a recording image of the entry page in case of recording a file by the directory structure shown in FIG. 14.

FIG. 14 shows an example of a hierarchical directory structure of the files recorded in the memory card 1 and FIG. 15 shows an image of the entry page when the files of this hierarchical directory structure is recorded on the memory card 1. It is noted that arrows entered in FIG. 15 indicate the destination of the parent pointer stated in the respective file entries and sub-entries.

With the present write-once format, used in the memory card 1 according to the present invention, it is possible to manage the files by the hierarchical directory structure by recording the root entry, sub-entry and the file entry in association with the generated files and directories. That is, on booting the memory card 1, the host equipment sequentially reads out all entry pages, beginning from the page with the spare block management number of zero. The totality of the entry pages are read out to detect the values of the parent pointers stated in the file entries and sub-entries. The parent-child relationship of the files and the directories, recorded in the memory card 1, can be managed by detecting the parent pointer in this manner.

In the file entry, there is stated the information on the storage locations of the filenames and files. Consequently, the host equipment is able to read out the file entity data by referencing these file entries.

Figure 16:
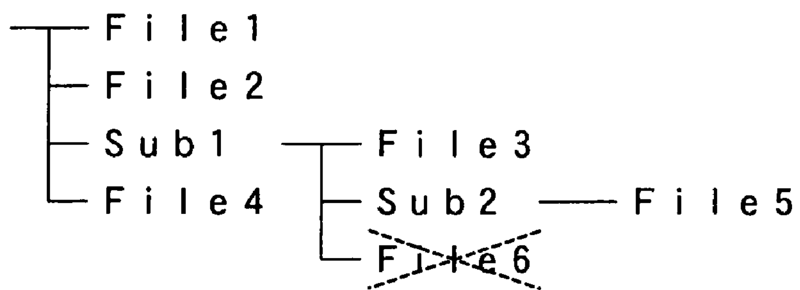
FIG. 16 shows the directory structure after deleting an optional file from the file of the directory structure shown in FIG. 14.
Figure 17:
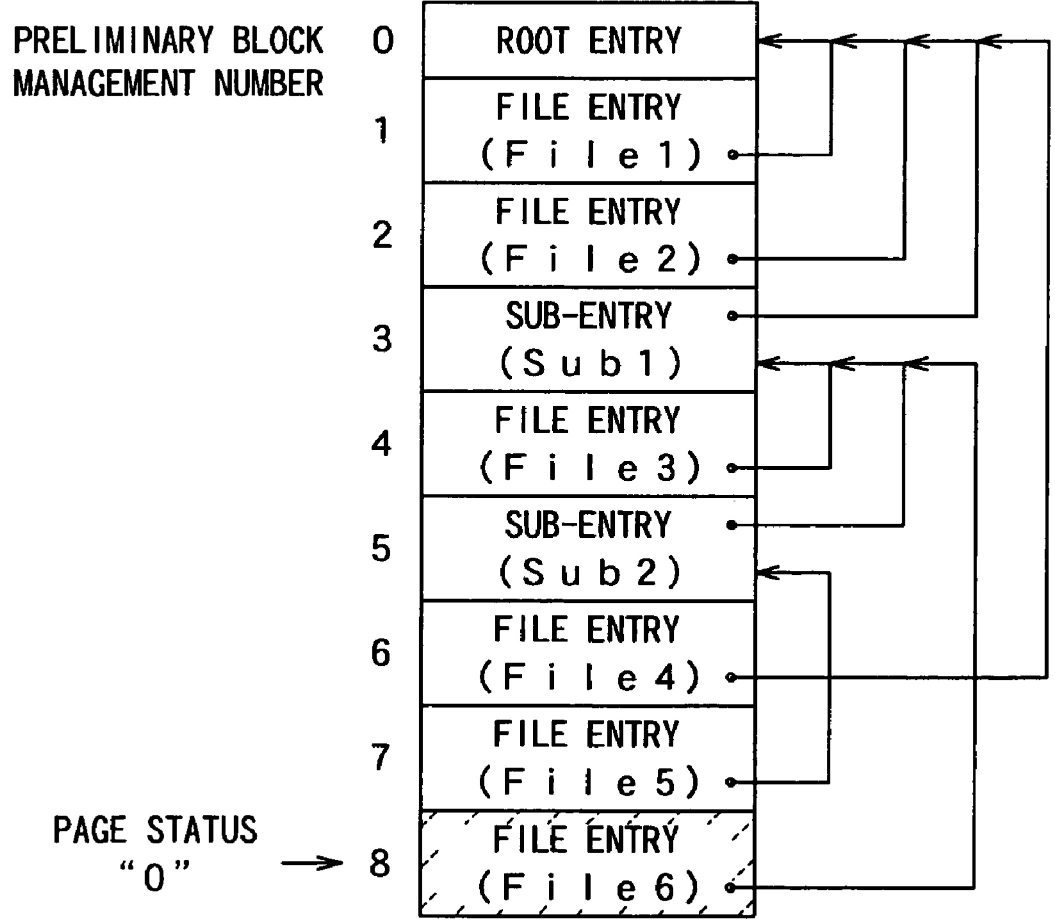
FIG. 17 shows a recording image of the entry page in case of deletion of the file shown in FIG. 16.

If, in the present write-once format, an arbitrary file is to be erased, the page status of the page, where there is recorded the file entry specifying the file, is set to "0" to invalidate the page. For example, if the "file 6" is to be erased, as shown in FIG. 16, it suffices to set "0" for the page status of the page where there is recorded the "file entry 7" specifying the file 6 (page with the spare block management number of "8"), as shown in FIG. 17. Thus, with the present write-once format, file erasure may also be made as the files are supervised by the hierarchical directory structure, so that file operations may be carried out easily as in the case of accessing to the conventional memory card which may be rewritten a plural number of times.

Meanwhile, the erasure or movement of a sub-directory is possible by re-generating and re-recording child files of the sub-directory and all entries pertinent to the child sub-directory. However, this processing is extremely cumbersome. Thus, it is desirable not to change the parent-child relationship on the way.

The session closing processing is hereinafter explained.

The file management data, other than entity data, in the MS-DOS compatible format, may be exemplified by MBR (master boot record), PBR (partition boot record), FAT (file allocation table), root directory entry and the sub-directory entry.

The MBR is the information arrayed at the leading end of a user area and states the boot information to the respective partitions. In the memory card 1 of the present invention, there is only one partition. The PBR is the information arrayed in the leading sector of the partition and states various information pertinent to the respective partitions. The FAT records the connecting state of the clusters (blocks) handled in the user area. The present memory card 1 records two FATs (FAT1, FAT2) by way of backup. The root directory entry states the entries of respective files and sub-directories arranged in the root directory. The sub-directory entry states the entries of respective files and sub-directories arranged in the sub-directory. Each directory is composed of two bytes in which there are stated the filename, attributes, recording date, beginning cluster (block) number and the file size (in byte unit).

The MS-DOS compatible format prescribes that these management data shall be recorded in the clusters having the logical addresses allocated thereto. In the memory card 1 of the present invention, the cluster is a block. The session closing processing is such processing in which the aforementioned management data of the MS-DOS compatible format are post-recorded to the blocks, having the logical addresses allocated thereto, by having reference to the contents of the management data recorded in accordance with the write-once format, to provide for readout compatibility with respect to the equipment adapted for coping with the conventional memory card. Although the logical addresses of the PBR are stated in the MBR, these need not be re-written insofar as the logical addresses of the PBR are not changed. Conversely, the PBR, FAT, root directory and the sub-directory entry need to be re-written responsive to the post-writing of the structure of files or directories. Thus, in the session closing processing, the PBR, FAT, root directory and the sub-directory entry are generated and recorded, even though the MBR is not generated nor recorded. The process steps of the session closing processing are now explained by referring to the flowchart shown in FIG. 18.

First, in a step S1, the host equipment 2 writes the first session anchor in the spare block management number next following the last recorded entry page. At this time, the host equipment 2 states the pair discrimination ID in the name field of the first session anchor. In this pair discrimination ID, a number indicating the number of times of the session closing processing performed on the present memory card 1 is stated. For example, "1" and "2" are stated for the first session closing processing and for the second session closing processing, respectively.

In the next step S2, the host equipment generates the PBR and the FAT, corresponding to the file management state at the current time point, based on the management data of the write-once format, and records the generated PBR and FAT on the memory card 1.

The FAT states the connection sequence of the blocks (clusters). This connection sequence may be generated by analyzing the file entry, root entry, sub-entry and the directory marker in the write-once format. It is because the write-once format prescribes that entity data forming a file basically shall be recorded in a block bearing a continuum of logical addresses, and that, if the entity data is partitioned into two chunks, the logical addresses of the latter chunk shall be stated by the fragment of the file entry.

It is noted that, in the first session closing processing, the host equipment records the PBR and the FAT in the effective block where the logical addresses are allocated as the outset. The block where the PBR and the FAT are recorded is stated in the MBR. This block is, for example, a block with the logical address of 1 or 2. that is, the host equipment records the PBR and the FAT for the block of the logical address indicated in the MBR.

In the second and following session closing processing, the host equipment records the PBR and the FAT in the spare block where the logical address has not been recorded. In this spare block, the PBR and the FAT are recorded in the 0 segment spare block. That is, the PBR and the FAT are recorded such that the reserve area is consumed from a region opposite to the management data (entry page) of the write-once format. The host equipment 2 sets the block use status of the recorded block to "0", while also recording the logical address. The value of the logical address is the same as that of logical address of the block where the original PBR and FAT have been recorded at the time of the previous session closing processing. The host equipment 2 then sets to "0" the block status of the block where the original PBR and FAT have been recorded at the time of the previous session closing processing. Finally, the host equipment 2 updates the conversion table of the logical address-physical block number the host equipment internally holds.

At the next step S3, the host equipment 2 generates a root directory entry and a sub-directory, which are in keeping with the current file management condition, based on the management data of the write-once format, and records the so generated root directory entry and the sub-directory.

It is noted that, at the time of the first session closing processing, the host equipment 2 records the root directory and the sub-directory entry in the effective block which is a block where the logical address has been pre-allocated. The block where the root directory is recorded is stated in the PBR. Thus, the host equipment 2 records the root directory entry in the block of the logical address indicated in this PBR. The host equipment 2 records the sub-directory entry in the effective blocks as from the segment 1.

In the second and the following session closing processing, the host equipment 2 records the root directory entry and the sub-directory entry in the spare block which is a block where no logical address has been pre-allocated. The host equipment 2 records the root directory entry in the segment 0 spare block among the spare blocks. That is, the host equipment records the root directory entry so that the reserve area will be consumed from an area opposite to the management data of the write-once format. The host equipment 2 records the sub-directory entry in the spare blocks as from the segment 1. However, even in the second and the following session closing processing, the sub-directory entry of the sub-directory generated for the first time, that is the sub-directory newly generated as from the previous session closing processing, is recorded in the effective block which is the block where the logical address has been pre-allocated. Even in this case, the sub-directory entry is recorded in the effective blocks as from the segment 1. If the root directory entry or the sub-directory entry has been recorded in the spare block, the host equipment 2 sets the block use state of the block to "0", while recording the logical address. The value of the logical address recorded is to be the same as that of the logical address of the block where the root directory entry or the sub-directory entry recorded at the time of previous session closing processing has been recorded. If the root directory entry or the sub-directory entry is recorded in the spare block, the host equipment 2 sets "0" for the block status of the block, where the root directory entry or the sub-directory entry recorded at the time of previous session closing processing has been recorded. Finally, the host equipment 2 updates the conversion table of the logical address-physical block number the host equipment internally holds.

If the host equipment 2 has added or updated the sub-directory entry, the host equipment 2 in a step S4 writes the directory marker for the so added or updated sub-directory entry in the spare block next to the session anchor recorded in the step S1.

Meanwhile, in the MS-DOS compatible format, each entry forming the root directory or the sub-directory is of a data size of 4 bytes (32 bits). Since the MS-DOS compatible format provides that the number of the files or the sub-directories below the root directory, that is, the number of entries, shall be up to 512, the capacity of the entity data of the root directory entries is one block (512 bytes×32 pages) at the maximum. That is, the root directory entries are necessarily comprised in one block. Conversely, there is no provision in the MS-DOS compatible format as to the number of the files and sub-directories below the sub-directory. Thus, the capacity of the entity data of the sub-directory entries occasionally exceeds one block. In such case, the sub-directory entries are recorded over plural blocks.

When the sub-directory entries are recorded over plural blocks, the host equipment 2 also records plural directory markers in one sub-directory. In more detail, if the number of the entries in the sub-directory is up to 512 (one block), the logical address of the block where the entity data of the sub-directory entry are recorded is stated by one directory marker. When the number of the entries in the sub-directory exceeds 512, a directory marker is created from block to block for the excess entries to indicate the range of the entries indicated in the block by way of discrimination.

When the subdirectory has been updated, there persists the directory marker recorded at the time of the directly previous and further previous session closing processing. In such case, the page status of the page containing the directory marker recorded at the time of the directly previous and further previous session closing processing is set to "0" for erasure.

In the next step S5, the host equipment 2 records the second session anchor next to the directory marker if such directory marker was recorded in the step S4 and next to the first session anchor, recorded in the step S1, if the directory marker was not recorded in the step S4. At this time, the host equipment states the same pair discrimination ID as that recorded in the first session anchor in the second session anchor.

By the above-described session closing processing, the host equipment is able to convert the memory card 1, supervised by the write-once format, into that supervised by the MS-DOS compatible format.

An exemplary hierarchical directory structure of the files recorded in the memory card 1 of the present invention, as well as the recording image of the entry pages and the recording image of the data recording region when the files of the hierarchical directory structure have been recorded in the memory card 1, are shown, by way of explanation of a specified instance of the session closing processing.

The memory card 1 of the present invention is supplied to the user after the first session closing processing carried out at the time of shipment from the plant. For example, prior to the first session closing processing (prior to shipment from the plant), the root directory and a "MEMSTICK.ind." file are recorded on the memory card 1, as shown in FIG. 19. It is now assumed that the first session closure processing is carried out after recording these files. Meanwhile, the "MEMSTICK.ind." file is a file stating the information indicating that the present device is the write-once memory card, and is generated below the root directory. In this recording state, the memory card 1 executes the first session closing processing.

FIG. 20 shows a recording image of the management data of the write-once format following the first session closing processing. Prior to the first session closing processing, the root entry and the fie entry (MEM) indicating the "MEMSTICK.ind." file have been recorded in a page area of the spare block management numbers of 0 and 1 in the memory card 1. After the end of the session closing processing, two session anchors (with the pair discrimination ID being "1") are recorded in a page area of the spare block management numbers of 2 to 3 in the memory card 1.

Figure 21:
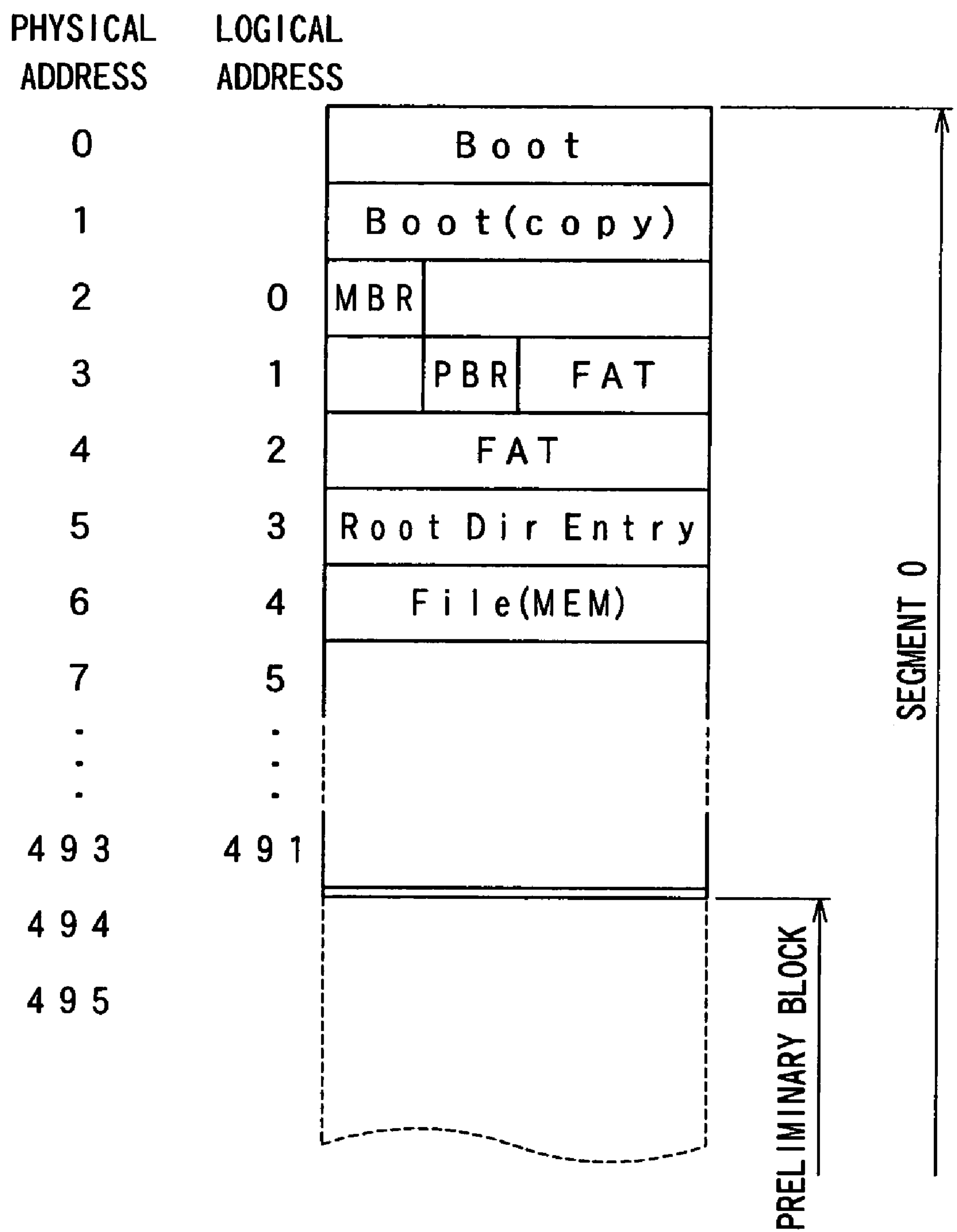
FIG. 21 shows a recording image of the data recording area following the first session closure processing.

FIG. 21 shows a recording image of the management data and the entity data following the first session closing processing. As shown in FIG. 21, boot is recorded in the blocks with the physical addresses of "0" to "1". The MBR is recorded in the block with the logical address of "0" (physical block number of 2), while the PBR and the FAT are recorded in the blocks with the logical addresses of "1" to "2" (physical block numbers of 3 to 4). The root directory entry is recorded in the blocks with the logical address of "3" (physical block number of 5), while the entity data of the "MEMSTICK.ind." file are recorded in the blocks with the logical address of "4".

Figures 22, 23:
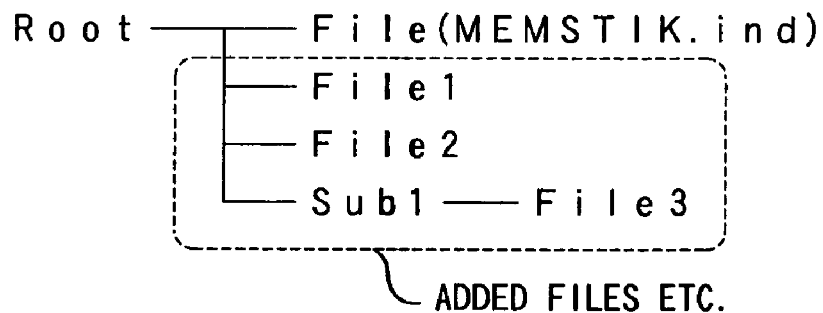
FIG. 22 shows the directory structure of a file recorded in a small-sized IC memory at the time of a second session closure processing.
FIG. 23 shows a recording image of the entry page following the second session closure processing.

It is assumed that a file shown for example in FIG. 22 is recorded in the memory card 1 following the first session closing processing described above, that is that the first file (File1), second file (File2) and the first sub-directory (Sub1) are post-written below the root directory, that the third file (File3) is post-written below the first sub-directory (Sub1) and that the second session closing processing is subsequently performed.

Figure 24:
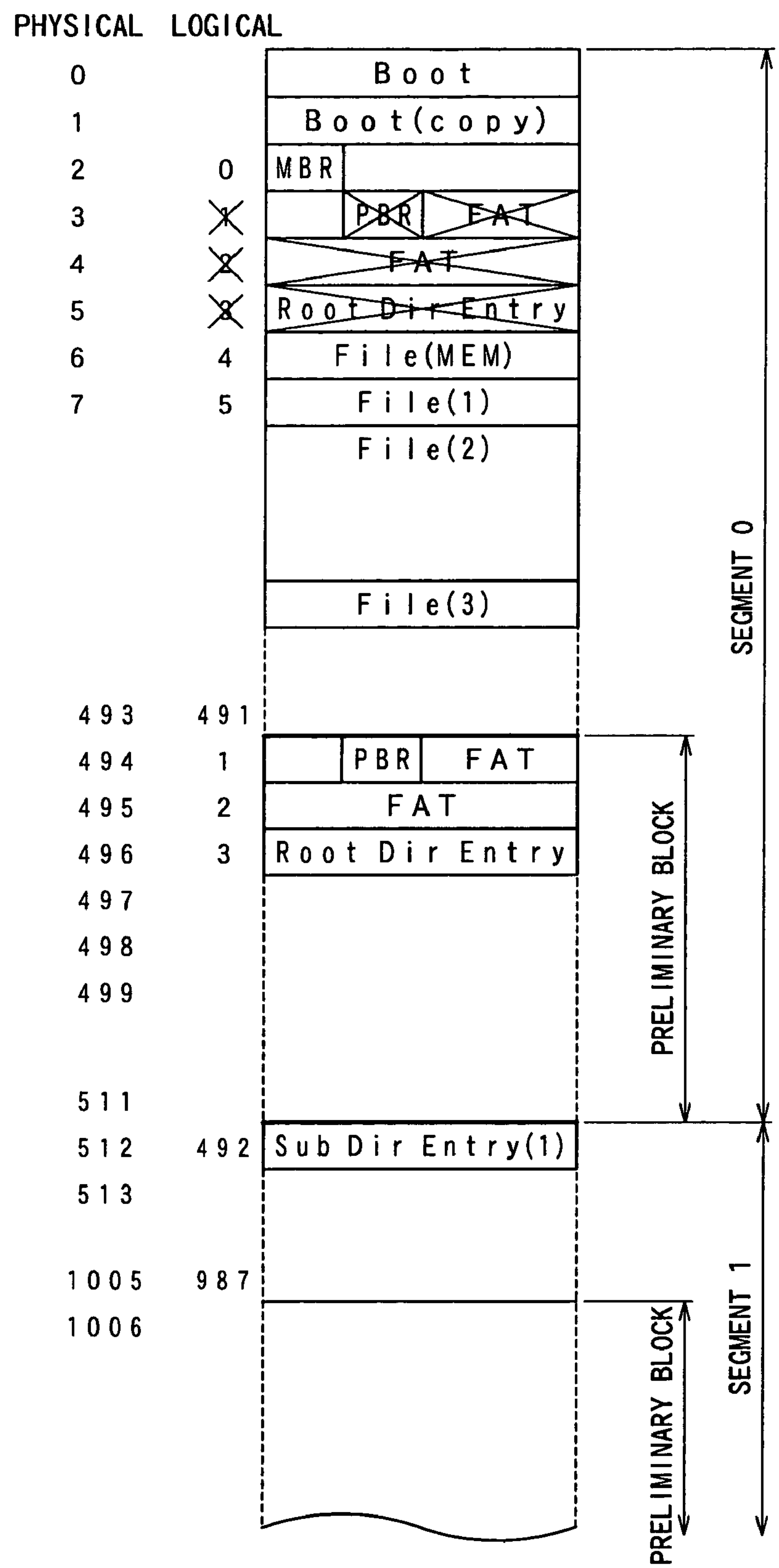
FIG. 24 shows a recording image of the data recording area following the second session closure processing.

FIG. 23 shows a recording image of management data of the write-once format following the second session closing processing. FIG. 24 shows a recording image of the management data and the entity data of the MS-DOS compatible format following the second session closing processing.

Following the first session closing processing and before second session closing processing, a file entry (1), specifying the first file (File1), a file entry (2), specifying the second file (File2), a sub-entry (1), specifying the first sub-directory (Sub1) and a file entry (3), specifying a third file (File3), are recorded in the page area of the spare block management numbers 4 to 7 of the memory card 1. The entity data of the first file (File1), the second file (File2) and the third file (File3) are recorded in the segment 0 data recording area.

If, in the above state, the second session closing processing is carried out, a first session anchor (with the pair discrimination ID of "2"), the directory mark (1) specifying the block where the sub-directory entry as the entity of the first sub-directory (Sub1) is stored, and the second session anchor (with the pair discrimination ID of "2") are recorded in the page area of the spare block management numbers of 8 to 10.

The root directory, FAT and PBR updated are recorded in the leading spare block (with the physical numbers of 494 to 496) in the segment 0. In the respective blocks, where the root directory, FAT and PBR are recorded, there is recorded the same logical address as the logical address of the block where the original root directory, FAT and PBR prior to updating were recorded. Specifically, the logical addresses 1 to 3 are recorded in the blocks of the physical block numbers of 494 to 496. By the second session closing processing, a sub-directory entry(1) of the first sub-directory (Sub1) is newly formulated and recorded in the recording area (block with the physical block number of 512 and the logical address of 492) of the segment 1. The PBR, FAT and the root directory, recorded at the time of the first session closing processing, are then erased. That is, the block status of the blocks with the physical block numbers of 3, 4 and 5 is set to "0".

Figure 25:
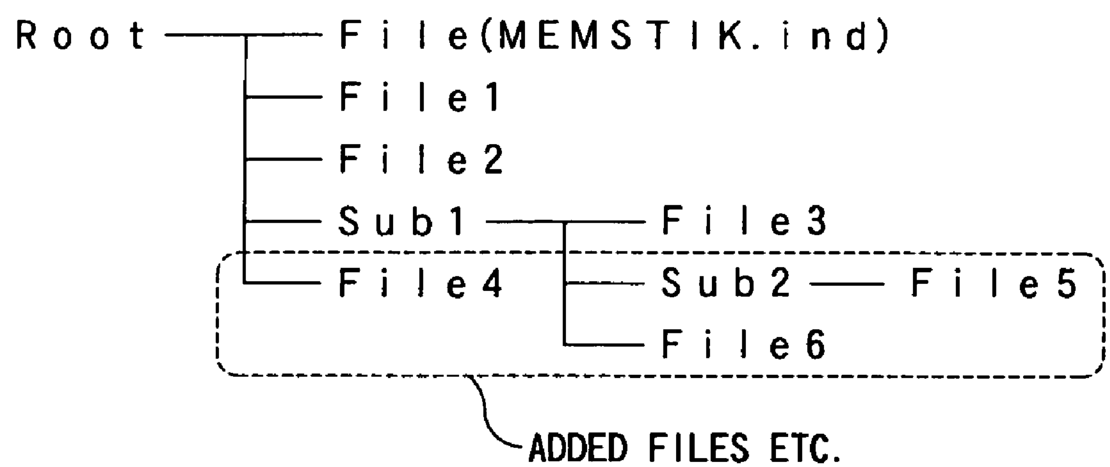
FIG. 25 shows the directory structure of a file recorded in a small-sized IC memory at the time of a third session closure processing.

It is assumed that files shown for example in FIG. 25 are added to the memory card 1 following the second session closing processing described above. That is, it is assumed that a fourth file (File4), a second subdirectory (Sub2), a fifth file (File5) and a sixth file (File6) are post-written below the root directory, first sub-directory (Sub1), second sub-directory (Sub2) and below the first sub-directory (Sub1), respectively. It is moreover assumed that a third session closing processing is subsequently carried out.

Figure 26:
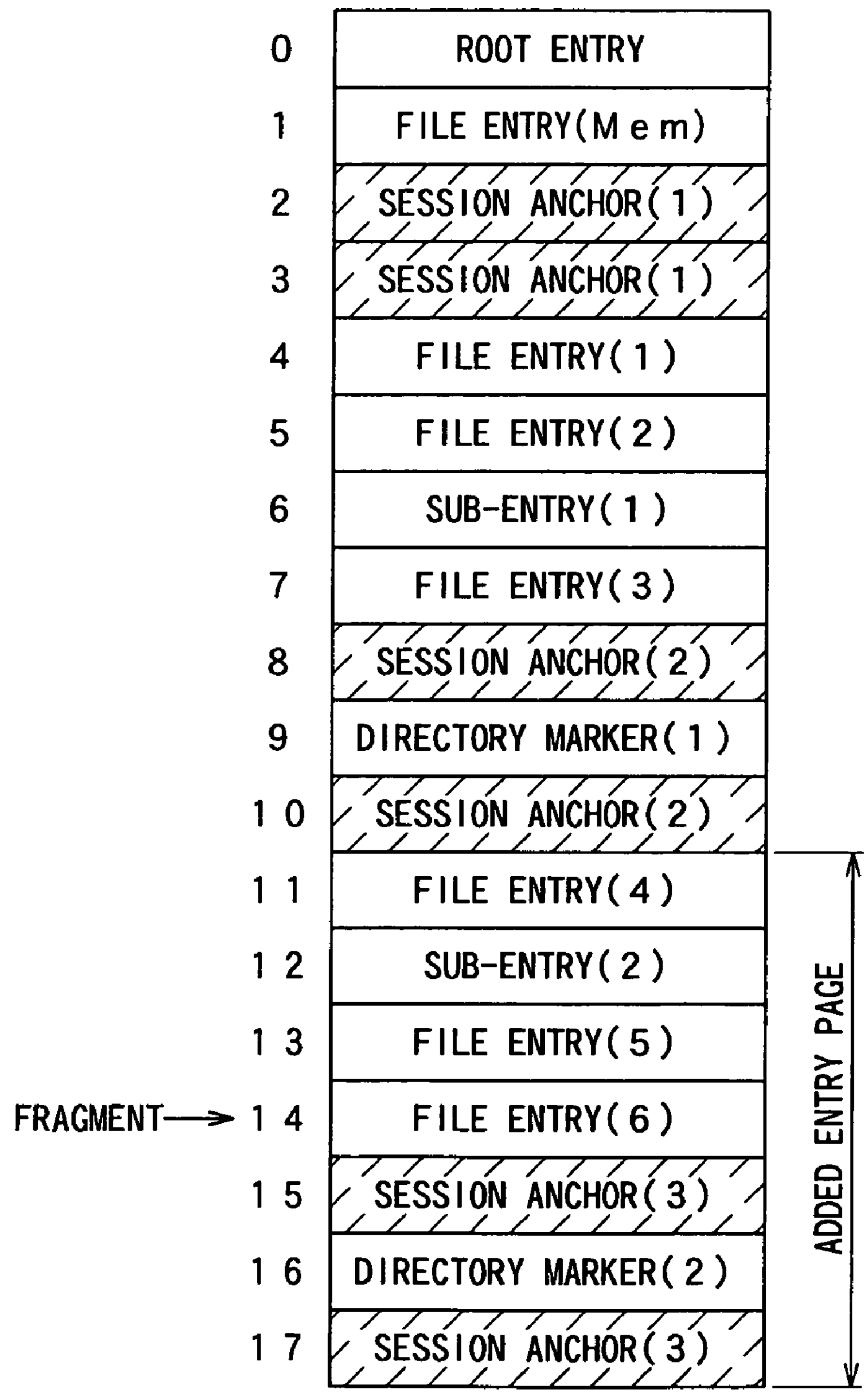
FIG. 26 shows a recording image of the entry page following the third session closure processing.
Figure 27:
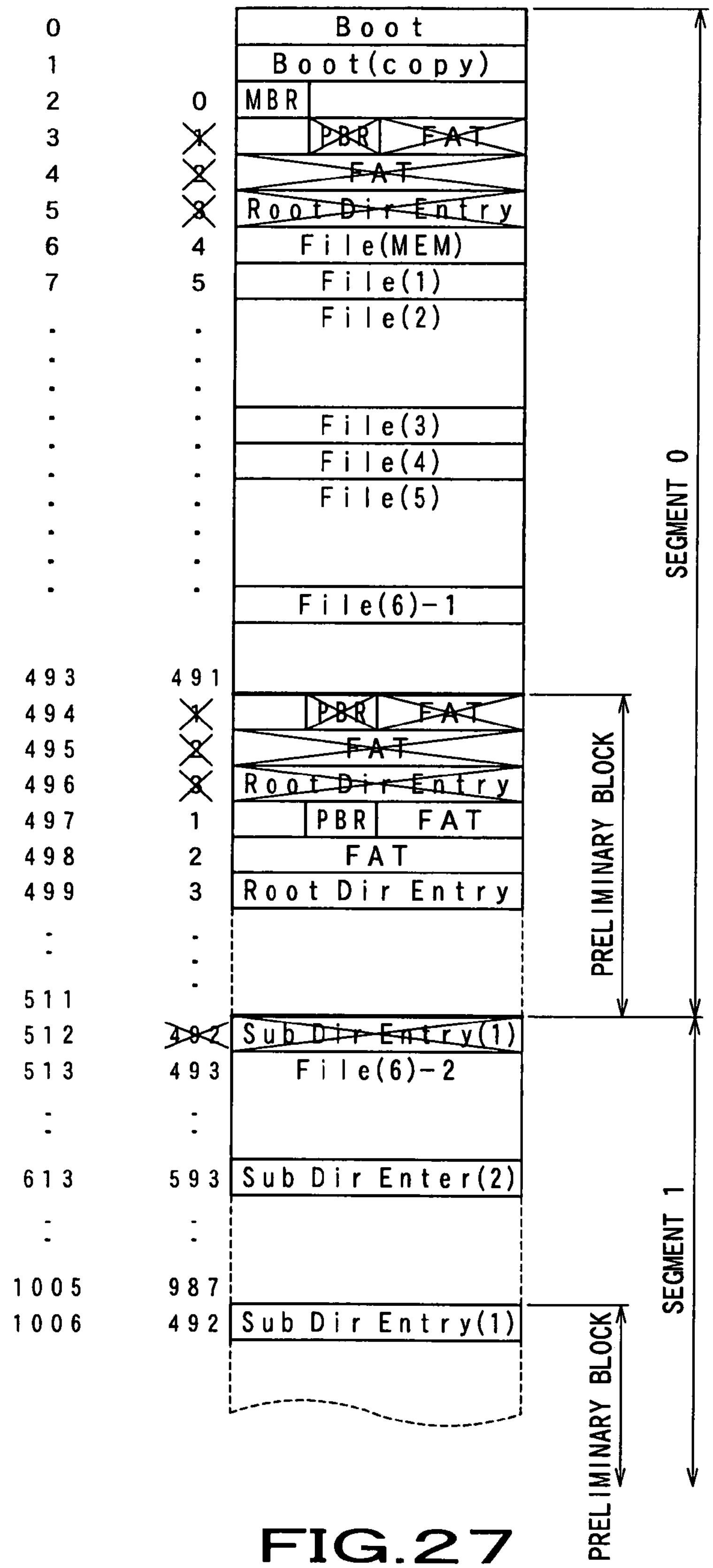
FIG. 27 shows a recording image of the data recording area following the third session closure processing.

FIG. 26 shows a recording image of the management data of the write-once format following the third session closing processing. FIG. 27 shows a recording image of the management data and the entity data of the MS-DOS compatible format following the third session closing processing.

Following the second session closing processing and before the third session closing processing, a file entry (4), specifying the fourth file (File4), a sub-entry (2), specifying a second sub-directory (Sub2), a file entry (5), specifying a fifth file (File6) and a file entry (6), specifying a sixth file (File6) are recorded in page areas of the memory card 1 having the spare block management numbers of 11 to 14, respectively. The entity data of the fourth file (File4) and the fifth file (File5) are recorded in the data recording area of the segment 0. The entity data of the sixth file (File6) is fragmented in two chunks which are recorded in the data area of the segment 0 and the data area of the segment 1. The first sub-directory entry (1) is inserted on the way in the entity data of the sixth file such that the logical addresses of the two areas fragmented are not consecutive to each other. In such case, a fragment is recorded in the file entry (6).

If, in the above state, the third session closing processing is executed, the first session anchor, with the pair discrimination ID of "3", a directory mark (2) specifying the block where there is stored the sub-directory entry as the entity of the first sub-directory (Sub2), and the second session anchor, with the pair discrimination ID of "3", are recorded in page areas with the spare block management numbers of 15 to 17, respectively.

The root directory, FAT and PBR updated are recorded in the spare block (with the physical numbers of 497 to 499) in the segment 0. In the respective blocks, where the root directory, FAT and PBR are recorded, there are recorded the same logical addresses as the logical addresses of the blocks where the original root directory, FAT and PBR prior to updating were recorded. Specifically, the logical addresses 1 to 3 are recorded in the block of the physical block numbers of 497 to 499. The sub-directory entry (1) of the updated first sub-directory (1) is recorded in the leading spare block (with the physical block number of 1006) in the segment 1. In the block where the sub-directory entry (1) is recorded, there is recorded the same logical address as the logical address of the block where the original root directory entry (1) prior to updating was recorded. Specifically, the logical address 494 is recorded in the block of the physical block number of 1004.

By the third session closing processing, the sub-directory entry (1) of the second sub-directory (Sub1) is newly formulated and recorded in the leading end of the vacant block of the data recording area of the segment 1 (for example, the block with the physical block number of 613 and the logical address of 593). The PBR, FAT and the root directory recorded during the second session closing processing and the sub-directory entry (1) of the first sub-directory (1) are then erased. That is, the block statuses of the blocks with the physical block numbers of 494, 495 and 496 and the block with the physical block number of 510 are set to "0".

The present invention is not limited to the embodiments described with reference to the drawings and, as may be apparent to those skilled in the art, various changes, substitutions or equivalents may be envisaged without departing from the scope and the purport of the invention as defined in the appended claims.

INDUSTRIAL APPLICABILITY

According to the present invention, a logical address is provided for each block of a recording medium as a predetermined data unit. Each block includes an area where there is recorded a data use status flag indicating that data has been recorded in the block and an area where there is recorded a block status flag indicating that data recorded in the block has been deleted. According to the present invention, in which a recording medium capable of writing data only once on the bit basis is supervised in this manner, a file etc. may be erased on the file system, even with the use of a write-once type memory as a data storage medium.

The invention claimed is:

1. A memory device, comprising:

a recording medium in which data can be written into each memory cell only once, said recording medium being divided into a plurality of blocks such that a given one of the plurality of blocks corresponds to specific one of a plurality of logical addresses, at least one of the plurality of blocks including a data area and a further area, said further area including a first area in which a data use status flag is recorded, the data use status flag indicating whether data has been recorded in the data area of that block, and including a second area in which a block status flag is recorded, the block status flag indicating whether the data recorded in the data area of that block has been deleted, at least one of the plurality of blocks being divided into a plurality of pages, each one of the plurality of pages being capable of storing a predetermined volume of data, at least one of the plurality of pages includes an intra-page data recording area where management data is recorded and an additional data recording area where additional data is recorded, the additional data recording area including a logical address area which stores the logical address that corresponds to the block that includes that page, the logical address that corresponds to the block that includes the page being pre-recorded in the logical address area prior to recording the management data.

2. The memory device according to claim 1, wherein at least one of the plurality of pages includes an associated portion of the data area of that block and includes another area in which a page status flag is recorded, the page status flag indicating whether data recorded in the portion of the data area associated with that page has been deleted.

3. The memory device according to claim 1, wherein the logical address that corresponds to the block that includes the page is recorded in the logical address area of at least a leading page in the block.

4. The memory device according to claim 1, wherein said recording medium is a write-once type non-volatile semiconductor memory.

5. A recording apparatus, comprising:

a recording unit operable to record data in a recording medium of a memory device, each memory cell of the recording medium being capable of having data written therein only once, the recording medium being divided into a plurality of blocks such that a given one of the plurality of blocks corresponds to specific one of a plurality of logical addresses, at least one of the plurality of blocks having a data area and a further area, the further area including a first area in which a data use status flag is recorded and a second area in which a block status flag is recorded;

said recording unit being operable to change a value of the data use status flag when data has been recorded in the data area of that block, to change a value of the block status flag when the data recorded in the data area of that block is deleted, to determine whether data has been recorded in the data area of the block based on the value of the data use status flag, and to determine whether data stored in the data area of the block has been deleted based on the value of the block status flag;

at least one of the plurality of blocks being divided into a plurality of pages, each one of the plurality of pages being capable of storing a predetermined volume of data, at least one of the plurality of pages includes an intra-page data recording area and an additional data recording area where additional data is recorded, the additional data recording area including a logical address area;

said recording unit being operable to record management data in the intra-page data recording area and to pre-record, in the logical address area prior to recording the management data, the logical address that corresponds to the block that includes that page.

6. The recording apparatus according to claim 5, wherein at least one of the plurality of pages includes an associated portion of the data area of that block and includes another area in which a page status flag is recorded, the page status flag indicating whether data recorded in the portion of the data area associated with that page has been deleted; and said recording unit is operable to change a value of the page status flag of the page when data recorded in the portion of the data area associated with that page is deleted and is operable to determine whether data recorded in the portion of the data area associated with that page has been deleted based on the value of the page status flag.

7. The recording apparatus according to claim 5, wherein said recording medium is a write-once type non-volatile semiconductor memory.

* * * * *

UNITED STATES PATENT AND TRADEMARK OFFICE

CERTIFICATE OF CORRECTION

PATENT NO. : 7,039,753 B2
APPLICATION NO. : 10/469208
DATED : May 2, 2006
INVENTOR(S) : Kaoru Suzuki and Manabu Onodera It is certified that error appears in the above-identified patent and that said Letters Patent is hereby corrected as shown below:

On the Title page of the patent in Item (54), "MEMORY DEVICE AND RECORDING AND/OR REPRODUCING APPARATUS USING THE SAME", should read --MEMORY DEVICE AND RECORDING AND/OR REPRODUCING APPARATUS EMPLOYING THIS MEMORY DEVICE--.

Column 1, the title of the invention, "MEMORY DEVICE AND RECORDING AND/OR REPRODUCING APPARATUS USING THE SAME", should read --MEMORY DEVICE AND RECORDING AND/OR REPRODUCING APPARATUS EMPLOYING THIS MEMORY DEVICE--.

Signed and Sealed this

Eighth Day of August, 2006

JON W. DUDAS
*Director of the United States Patent and Trademark Office*